United States Patent
Hattori et al.

(10) Patent No.: US 8,954,963 B2
(45) Date of Patent: Feb. 10, 2015

(54) METHOD AND APPARATUS FOR RESETTING A PHYSICAL I/O ADAPTER WITHOUT STOPPING A GUEST OS RUNNING ON A VIRTUAL MACHINE

(75) Inventors: Naoya Hattori, Yokohama (JP); Yuta Sawa, Fujisawa (JP); Keitaro Uehara, Machida (JP)

(73) Assignee: Hitachi, Ltd., Tokyo (JP)

( * ) Notice: Subject to any disclaimer, the term of this patent is extended or adjusted under 35 U.S.C. 154(b) by 376 days.

(21) Appl. No.: 13/368,634

(22) Filed: Feb. 8, 2012

(65) Prior Publication Data

US 2012/0246644 A1 Sep. 27, 2012

(30) Foreign Application Priority Data

Mar. 25, 2011 (JP) ................................. 2011-067444

(51) Int. Cl.
  *G06F 9/455* (2006.01)
  *G06F 9/44* (2006.01)

(52) U.S. Cl.
  CPC .......... *G06F 9/4411* (2013.01); *G06F 9/45558* (2013.01); *G06F 2009/45575* (2013.01)
  USPC .......................................................... 718/1

(58) Field of Classification Search
  CPC .................... G06F 9/5077; G06F 2009/45579; G06F 1/24
  USPC .......................................................... 718/1
  See application file for complete search history.

(56) References Cited

U.S. PATENT DOCUMENTS

| 7,487,403 B2 | 2/2009 | Hsu et al. |
| 8,156,253 B2 | 4/2012 | Watanabe |
| 2009/0133016 A1 | 5/2009 | Brown et al. |
| 2009/0133028 A1* | 5/2009 | Brown et al. ................. 718/104 |
| 2009/0144731 A1* | 6/2009 | Brown et al. ..................... 718/1 |
| 2009/0276773 A1* | 11/2009 | Brown et al. ..................... 718/1 |
| 2012/0005521 A1* | 1/2012 | Droux et al. ..................... 718/1 |
| 2012/0192178 A1* | 7/2012 | Brownlow et al. ............... 718/1 |

FOREIGN PATENT DOCUMENTS

JP 2009-301162 A 12/2009

OTHER PUBLICATIONS

PCI Express Base Specification Revision 2.1, Mar. 4, 2009, pp. 554-571.

* cited by examiner

*Primary Examiner* — Mohammed Rehman
*Assistant Examiner* — Xuxing Chen
(74) *Attorney, Agent, or Firm* — Mattingly & Malur, PC

(57) ABSTRACT

A method of controlling a virtual machine of a computer, the computer comprising: a physical machine comprising an I/O adapter having a physical function that creates a virtual function; a virtualization unit that provides computer resources of the physical machine to the virtual machine; and an OS that is executed on the virtual machine, the virtualization unit creating a virtual machine to which the virtual function is assigned, the virtual machine running the OS thereon, the method comprising: a first step of detecting, by the virtualization unit, a state change of the I/O adapter; a second step of identifying, by the virtualization unit, when a state of the I/O adapter becomes a predetermined state, the virtual machine to which the virtual function is assigned; and a third step of notifying, by the virtualization unit, the OS running on the identified virtual machine of the state of the I/O adapter.

10 Claims, 20 Drawing Sheets

FIG. 4

| PF# | VF# | VIRTUAL MACHINE # |
|---|---|---|
| PF1 | VF1-1 | 0 |
| PF1 | VF1-2 | 1 |
| : | : | : |
| PF8 | VF8-8 | NOT ASSIGNED |

| PF# | STATE | REMOVAL PENDING BITMAP |
|---|---|---|
| PF1 | RESET NEEDED | 00000011 |
| PF2 | NORMAL | 00000000 |
| PF3 | REPLACEMENT NEEDED | 00010000 |
| : | : | : |
| PF8 | NORMAL | 00000000 |

400 510 520

| PF# | VF# | STATE |
|---|---|---|
| PF1 | VF1-1 | RESET NEEDED |
| PF1 | VF1-2 | NORMAL |
| PF1 | VF1-3 | REPLACEMENT NEEDED |
| : | : | : |
| PF8 | VF8-8 | NORMAL |

400　　　410　　　620

METHOD AND APPARATUS FOR RESETTING A PHYSICAL I/O ADAPTER WITHOUT STOPPING A GUEST OS RUNNING ON A VIRTUAL MACHINE

CLAIM OF PRIORITY

The present application claims priority from Japanese patent application JP 2011-067444 filed on Mar. 25, 2011, the content of which is hereby incorporated by reference into this application.

BACKGROUND OF THE INVENTION

This invention relates to a virtual machine, and more particularly, to a technology for processing error recovery of an I/O device without stopping a guest OS running on a virtual machine.

With improvements in performance and enhancement in functionality of open-system servers, server virtualization software (hypervisor or VMM) is widely used as a method of effectively making use of processor cores mounted to physical servers. The hypervisor creates a plurality of virtual machines on one physical server, and controls an OS or applications to run on each of the virtual machines. In recent years, concurrently with improvements in performance of processors, it is not a rare case to operate ten or more virtual machines (LPARs) on the physical server. However, as the number of virtual machines running on the physical server increases, two problems with the I/O device have emerged.

Problem 1 (performance problem): The intermediation of the hypervisor is essential in order to realize "I/O sharing" for controlling a physical I/O adapter to behave as a plurality of virtual I/O adapters. In this case, due to the hypervisor's intermediation overhead, limitations are imposed on I/O performance available to the virtual machine.

Problem 2 (reliability problem): Up to now, the open-system server is not provided with a mechanism for transmitting a detected I/O adapter error to software such as an OS. Therefore, if an error occurs in the physical I/O adapter, the entire physical server always goes down because the scale or type of the error cannot be determined, which damages all the virtual machines running on the physical server.

In order to solve those problems, PCI-SIG has specified two standards, the I/O Virtualization (IOV) and the Advanced Error Reporting (AER).

The IOV is a system for providing a main portion of the "I/O sharing" in a hardware form in order to solve the above-mentioned performance problem. With the use of the IOV, the intermediation of the hypervisor is limited to low-frequency processings such as initialization, and hence high I/O performance becomes available to the virtual machine.

Meanwhile, the AER is a system for transmitting information on the I/O adapter error to the software such as an OS in order to solve the above-mentioned reliability problem as described in PCI Express(r) Base Specification Revision 2.1 (§7.10. Advanced Error Reporting Capability). According to the AER, the software such as an OS becomes capable of determining the degree of seriousness of the error, and if the error is minor, it is possible to recover the I/O adapter by a method such as resetting and to continue operating the physical server and the virtual machines.

It should be noted that as a technology that utilizes the IOV, US 2009/133016 discloses a basic operation of the hypervisor. US 2009/133016 involves a technology that utilizes hot plugging (technology for mounting/removing a physical function (hereinafter, referred to as "PF") while the server is running) of the PF as a method of handling an error of the PF of the I/O adapter compatible with the IOV. With the use of the technology described in US 2009/133016, if an error occurs in the PF, maintenance personnel, an administrator, or the like can replace the I/O adapter.

SUMMARY OF THE INVENTION

However, US 2009/133016 described above does not include a description of a method of handling a minor error. Immediately after the I/O adapter is powered on or reset, an IOV function is disabled from the viewpoint of compatibility with a non-IOV adapter. Therefore, in the I/O adapter compatible with the IOV, a virtual I/O adapter function (hereinafter, referred to as "virtual function (VF)") for the I/O sharing is disabled immediately after the hot plugging, and hence the use of the technology of US 2009/133016 raises the following problem.

In the event of a minor error, if the I/O adapter (PF) is reset in accordance with the mechanism of the AER, the IOV function is disabled, and hence the virtual I/O adapter function (VF) created in accordance with the IOV disappears from the virtual machine. In general, an OS operating on a virtual machine (hereinafter, referred to as "guest OS") is designed for a physical I/O adapter (PF), and hence a situation in which the I/O adapter suddenly disappears is beyond the scope of the assumption. Therefore, if the VF suddenly disappears, the guest OS may crash. Further, US 2009/133016 described above has a problem that the PF must be reset even for a minor error, and replacement work needs to be performed by a maintenance person for recovery from the error, which involves time and labor for maintenance.

Therefore, this invention has been made in view of the above-mentioned problems, and it is an object thereof to cause an I/O adapter compatible with the IOV to satisfy high performance, high reliability, and ease of maintenance. In particular, it is an object of this invention to avoid the crashing of the guest OS ascribable to unintended disappearance of a VF caused by PF resetting of the I/O adapter without permission and to automatically recover from the minor error of the I/O adapter.

A representative aspect of this invention is as follows. A method of controlling a virtual machine of a computer, the computer comprising: a physical machine comprising a processor, a memory, and an I/O adapter having a physical function that creates a virtual I/O adapter as a virtual function; a virtualization unit that provides computer resources of the physical machine to the virtual machine; and an OS that is executed on the virtual machine, the virtualization unit creating at least one virtual machine to which the virtual function is assigned, the at least one virtual machine running the OS thereon, the method comprising: a first step of detecting, by the virtualization unit, a state change of the I/O adapter; a second step of identifying, by the virtualization unit, when a state of the I/O adapter becomes a predetermined state, the virtual machine to which the virtual function created by the physical function is assigned; and a third step of notifying, by the virtualization unit, the OS running on the identified virtual machine of the state of the I/O adapter.

Accordingly, this invention is provided with the physical I/O adapter having an I/O sharing function, and the virtualization unit assigns the virtual I/O adapter (VF) to the virtual machine. The virtualization unit operates less frequently except for a specific case where an error occurs, and hence the high performance can be realized. Next, a removal permission to remove the VF from the OS of the virtual machine is granted prior to the resetting of the function (PF) of the physical I/O adapter to be a trigger that causes the VF to disappear. This can avoid the OS crash due to the disappearance of the VF. Accordingly, the high reliability is realized. If a PF driver determines the minor error, the PF is reset without the help of the maintenance personnel, and an attempt is made to recover the physical I/O adapter. If the physical I/O adapter is successfully recovered, the VF is reassigned to the virtual machine, and the virtual machine is returned to a state before the error occurred. Accordingly, the maintenance is facilitated. As described above, the high performance, the high reliability, and the ease of maintenance are satisfied.

BRIEF DESCRIPTION OF THE DRAWINGS

FIG. 4 illustrates a configuration example of the adapter assignment table according to the first embodiment.

FIG. 5 illustrates a configuration example of the PF state table according to the first embodiment.

DETAILED DESCRIPTION OF THE PREFERRED EMBODIMENTS

Hereinafter, embodiments of this invention are described with reference to the accompanying drawings.

First Embodiment

Figure 1:
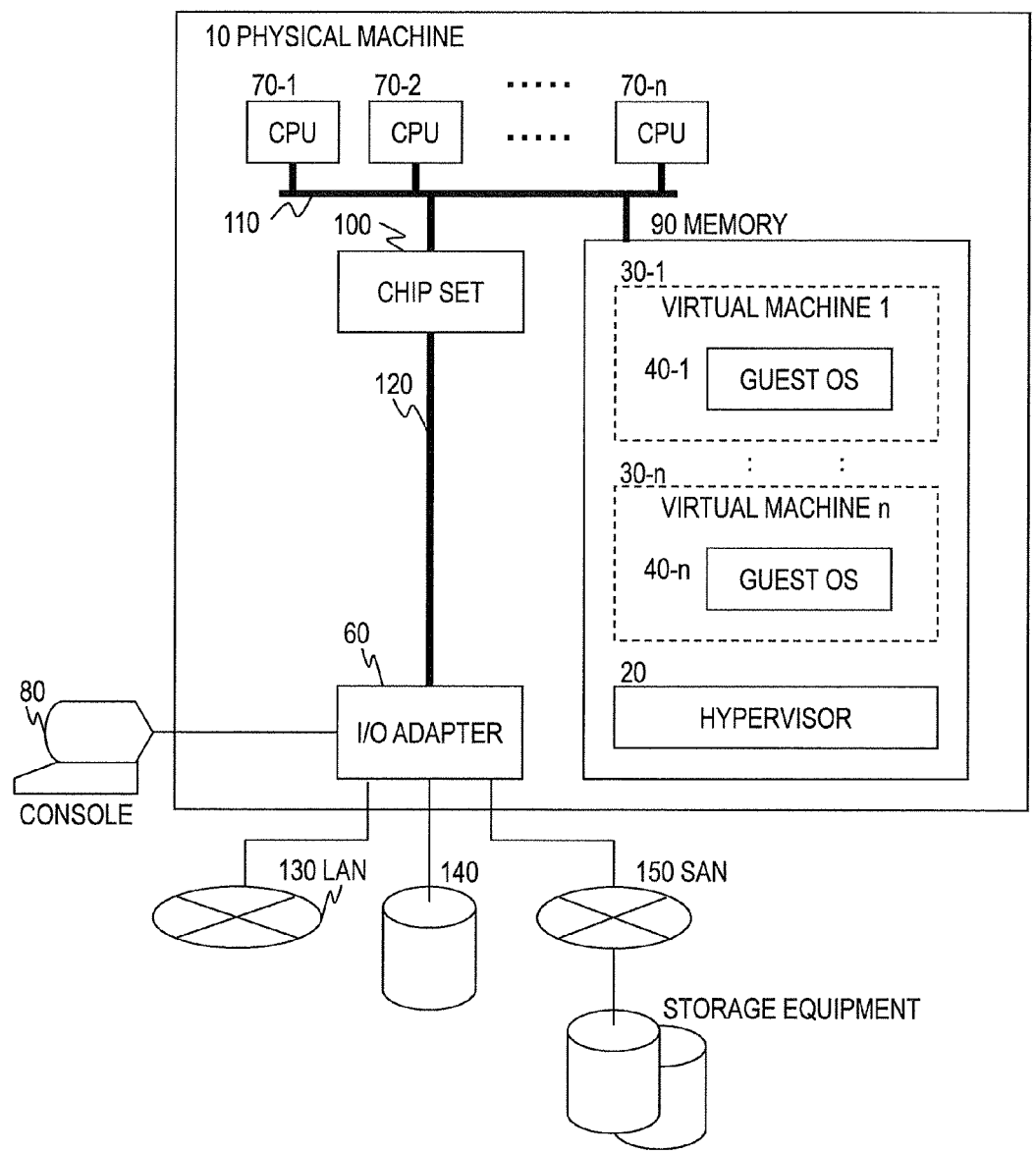
FIG. 1 is a block diagram illustrating an example of a virtual machine system according to a first embodiment.

FIG. 1 illustrates a first embodiment of this invention, and is a block diagram illustrating an example of a virtual machine system using an I/O adapter compatible with the I/O Virtualization (IOV) and the Advanced Error Reporting (AER). An I/O adapter 60 according to this embodiment has a physical function (hereinafter, referred to as "PF") of a physical I/O adapter and a function of creating a virtual I/O adapter (hereinafter, referred to as "virtual function (VF)") that realizes "I/O sharing", and descriptions are made of a configuration and an operation for a case where the VF is assigned to a virtual machine.

(1. Hardware Configuration)

FIG. 1 illustrates a configuration example of a physical machine that operates the virtual machine system serving as the first embodiment of this invention. The physical machine includes at least one CPU 70 (or processor core) providing an error detection function, and the at least one CPU 70 is coupled to a chipset 100 and a memory 90 via an interconnect 110 such as a QuickPath Interconnect (QPI) or a Scalable Memory Interconnect (SMI).

The chipset 100 is coupled to the I/O adapter 60 via a bus 120 such as a PCI express. The I/O adapter 60 includes a network adapter coupled to a LAN 130, a SCSI adapter coupled to a disk drive 140 or the like, a fibre channel adapter coupled to a storage area network 150 (SAN), and a graphic controller coupled to a console 80.

The CPU 70 accesses the memory 90 via the interconnect 110, and accesses the I/O adapter 60 from the chipset 100 to perform a predetermined processing.

The memory 90 has a hypervisor 20 loaded therein as a virtualization unit, and virtual machines 30-1 to 30-$n$ controlled by the hypervisor 20 execute guest OSs 40-1 to 40-$n$, respectively. The hypervisor 20 divides or virtualizes computer resources of a physical machine 10 and assigns the computer resources to the virtual machines. It should be noted that hereinafter, the virtual machines 30-1 to 30-$n$ are referred to generically as "virtual machine 30", and the guest OSs 40-1 to 40-$n$ are referred to generically as "guest OS 40".

(2. Software Configuration)

Figure 2:
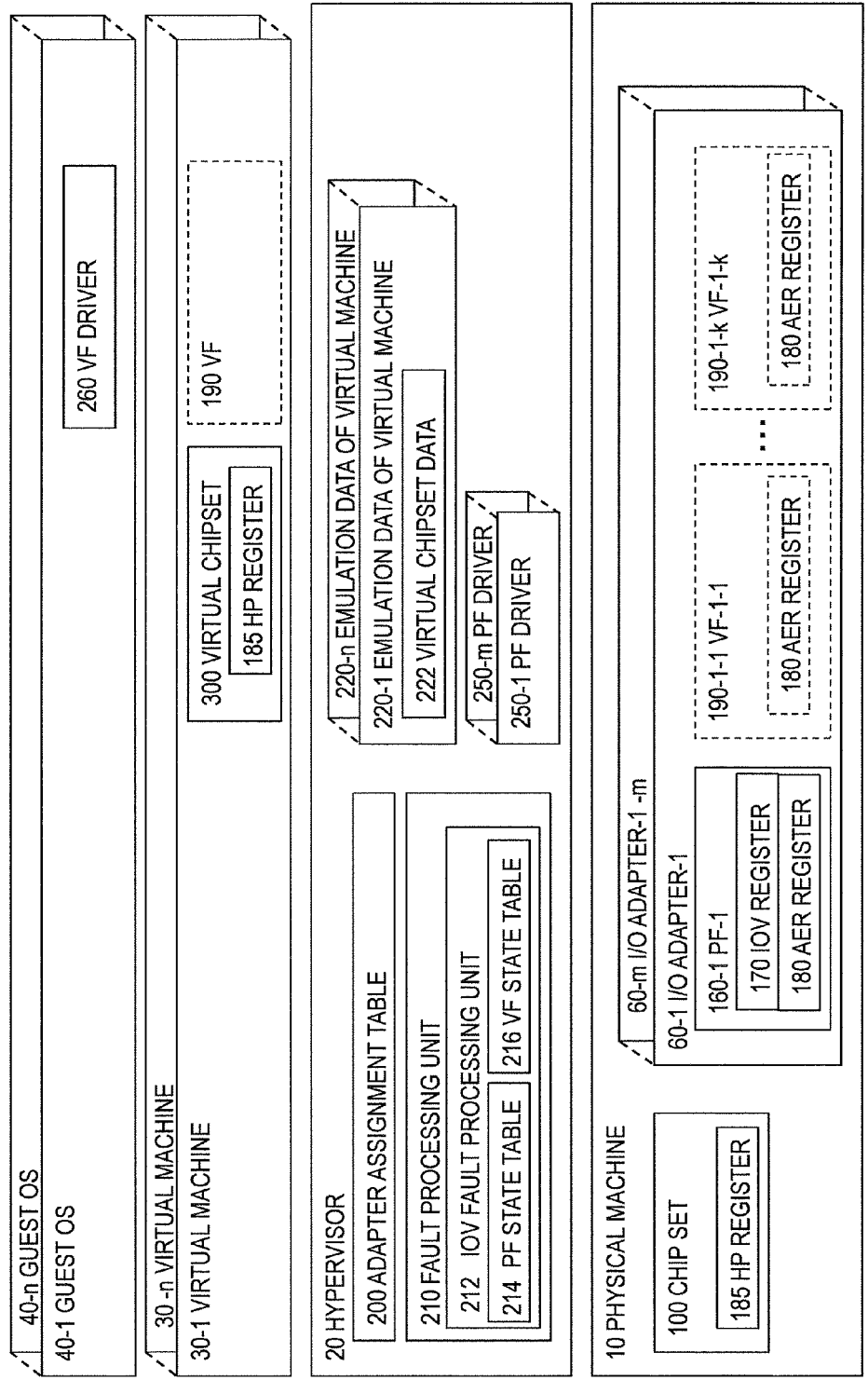
FIG. 2 is a block diagram illustrating a relationship between the physical machine and software according to the first embodiment.

Next, referring to FIG. 2, detailed descriptions are made of main portions of a software configuration which realize the virtual machine 30 on the physical machine 10 and hardware components to be controlled. FIG. 2 is a block diagram illustrating a relationship between the physical machine and software.

The hypervisor 20 that controls the at least one virtual machine 30 runs on the physical machine 10. The physical machine 10 includes the chipset 100 and the at least one I/O adapter 60.

The chipset 100 includes a hot plug register (hereinafter, referred to as "HP register") 185 that includes a register retaining a removal (mounting/removing) request (hot remove request) of the I/O adapter 60 and a register retaining a mounting announcement (hot add notification) thereof. Further, the chipset 100 has a function of generating an interrupt when recognizing the removal request or mounting announcement of the I/O adapter 60 or an error thereof and notifying the hypervisor 20 running on the physical machine 10 of the request or the occurrence of the error.

The at least one I/O adapter 60 has an IOV function, and includes physical functions (PFs) 160 (160-1 to 160-m) and virtual functions (VFs) 190 (190-1-1 to 190-m-k). The PF 160 is a function that can be used any time, while the VF 190 is a function that can be used only in a case where the IOV function is effective. It should be noted that the physical machine 10 may include the I/O adapter 60 incompatible with the IOV.

The PF 160 has a function of transmitting/receiving data to/from an external portion of the physical machine 10, and includes an IOV register 170 that controls the IOV function and an AER register 180 that retains error information such as the presence/absence and type of the error related to the PF.

The VF 190 has the function of transmitting/receiving data to/from the external portion of the physical machine 10 only in the case where the IOV function is effective, and includes the AER register 180 that retains error information such as the presence/absence and type of the error related to the VF.

Here, two kinds of AER registers 180 exist, in other words, the AER register 180 of the PF 160 and the AER register 180 of the VF 190 exist. The AER register 180 of the PF 160 retains information regarding the error of a physical function, in other words, the physical I/O adapter 60, and the AER register 180 of the VF 190 retains information regarding the error of a virtual function, in other words, the virtual I/O adapter. It should be noted that the I/O adapter 60 includes a controller (not shown) that sets the error information in the AER register 180 at a time of the occurrence of the error.

The hypervisor 20 creates the virtual machine 30, and provides the virtual machine 30 with a function (virtual chipset 300) corresponding to the chipset 100. The hypervisor 20 also includes a function (pass-through function) of exclusively assigning an arbitrary VF 190 to an arbitrary virtual machine 30 and permitting the guest OS 40 running on the arbitrary virtual machine 30 to directly operate the VF 190. The pass-through function allows one I/O adapter 60 to be shared by the plurality of virtual machines 30 through the VFs 190.

The hypervisor 20 includes an adapter assignment table 200 that retains an assignment relationship of the VF 190 to the virtual machine 30, a fault processing unit 210 that monitors the physical machine 10 or physical machine resources and is called at the time of the occurrence of the error, emulation data 220 of the virtual machine that retains states of the virtual machine 30, and PF drivers 250 (250-1 to 250-m) that each include a control procedure corresponding to the type of the PF 160.

The fault processing unit 210 includes an IOV fault processing unit 212 in charge of the error of the I/O adapter 60 corresponding to the IOV function, and the IOV fault processing unit 212 includes a PF state table 214 that retains an error handling status of the PF 160 and a VF state table 216 that retains an error handling status of the VF 190.

The emulation data 220 of the virtual machine includes virtual chipset data 222 for retaining states related to a virtual part or a device such as the virtual chipset 300 provided to the virtual machine 30. The virtual chipset data 222 retains the states of the HP register 185 and the like to be retained by the virtual chipset 300.

The PF driver 250 has a function of operating the IOV register 170, a function of determining whether or not the error that has occurred in the PF 160 is a minor error or a major error, and a function of determining whether or not the PF has recovered from the error after resetting thereof.

The virtual machine 30 includes the virtual part such as the virtual chipset 300 provided by the hypervisor 20 and the exclusively assigned VF 190. The virtual machine 30 has the guest OS 40 running thereon. The guest OS 40 operates the VF 190 by using a VF driver 260 corresponding to the type of the VF 190.

The VF driver 260 has a function of determining an extent of the error by which it is determined whether or not the error that has occurred in the VF 190 the minor error or the major error and a function of determining whether or not the VF has recovered from the error after resetting thereof.

Figure 3:
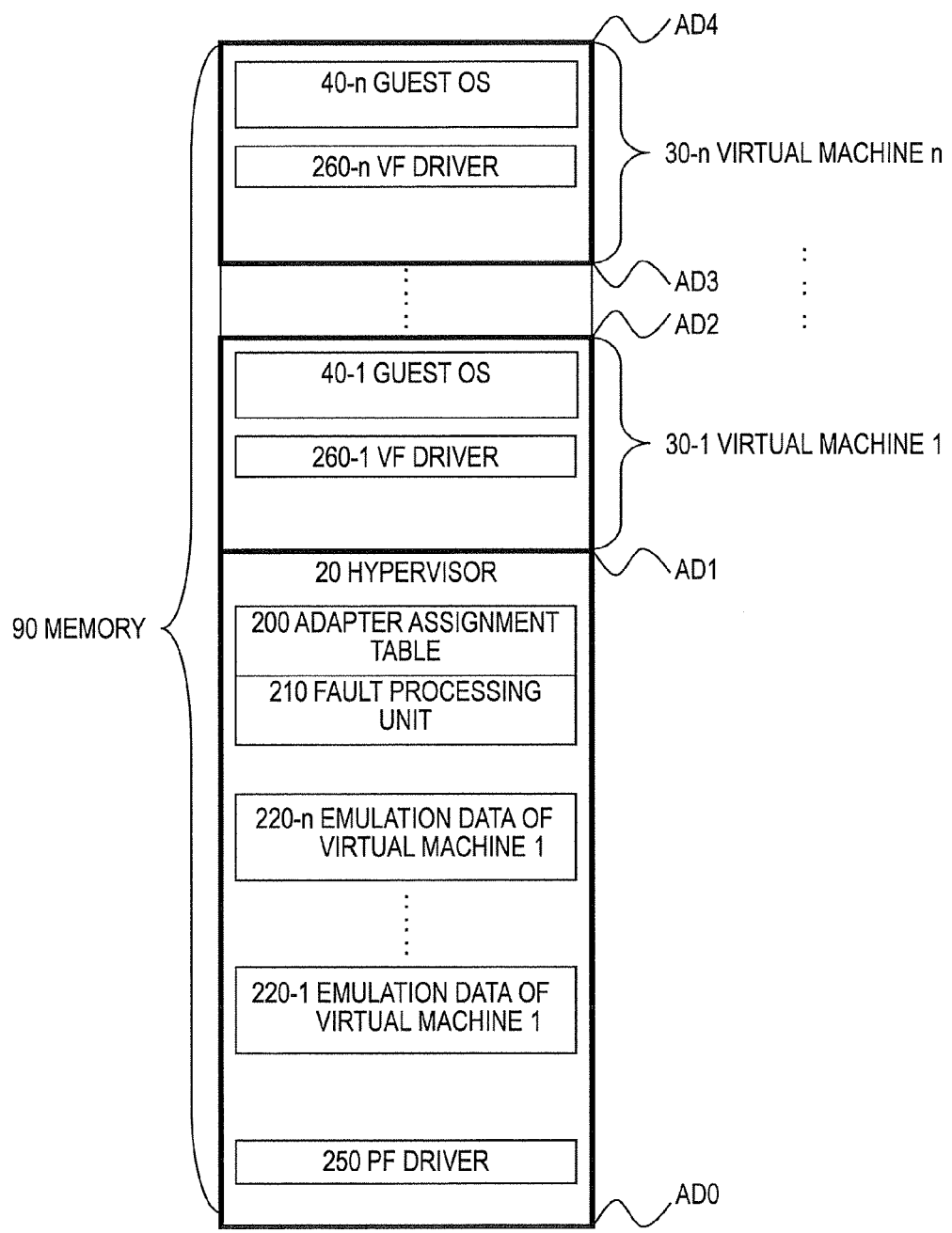
FIG. 3 illustrates an example of an address map of the memory managed by the hypervisor according to the first embodiment.

FIG. 3 illustrates an example of an address map of the memory 90 managed by the hypervisor 20.

The hypervisor 20 assigns an area in which the hypervisor 20 itself is to be deployed on the memory 90 and an area used by the virtual machine 30. For example, as illustrated in FIG. 3, the hypervisor 20 assigns addresses AD0 to AD1 to itself, addresses AD1+1 to AD2 to the virtual machine 30-1, and addresses AD3 to AD4 to the virtual machine 30-n. Stored in the area for each of the virtual machines 30 are the guest OS 40 and the VF driver 260 (260-1 to 260-n).

Stored in the area used by the hypervisor 20 are the adapter assignment table 200, the fault processing unit 210, the emulation data 220 of the virtual machine, and the PF driver 250.

FIG. 4 illustrates a configuration example of the adapter assignment table 200. The adapter assignment table 200 is a table that retains the assignment relationship between the VF 190 and the virtual machine 30. In this table, a serial number (virtual machine number) 420 of the virtual machine 30 to which the VF 190 is assigned is stored by using a serial number (PF#) 400 of the PF 160 that has created the VF 190 and a serial number (VF#) 410 of the VF 190 as means for identifying the VF 190. In a case of not being assigned, a virtual machine number 420 is set to "not assigned".

FIG. 5 illustrates a configuration example of the PF state table 214. In the PF state table 214, one entry is formed of the serial number (PF#) 400 of the PF 160, a state 510 of the PF 160 indicating the error handling status of the PF 160, and a removal pending bitmap 520 that stores the presence/absence of a removal permission for the respective VFs 190 created from the PF 160. The PF#400 is used to identify the PF 160. The state 510 retains any one of a state in which an error handling operation is unnecessary (normal), a state in which the resetting of the PF 160 becomes necessary due to the minor error (reset needed), and a state in which the replacement of the PF 160 becomes necessary due to the major error (replacement needed). In the removal pending bitmap 520, each of bits thereof corresponds to each of the VFs 190 created by the PF 160, and stores "1" in a case where the removal permission for the VF 190 is being requested to the guest OS 40 and "0" in a case where no request has been made or a permission has been granted. When all the bits of the removal pending bitmap 520 becomes "0", it is possible to reset the PF.

Figure 6:
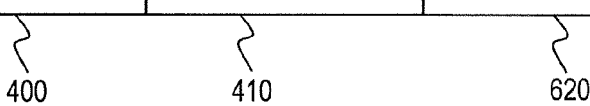
FIG. 6 illustrates a configuration example of the VF state table according to the first embodiment.

FIG. 6 illustrates a configuration example of the VF state table 216. The VF state table 216 retains the serial number (PF#) 400 of the PF 160, the serial number (VF#) 410 of the VF 190, a state 620 of the VF 190 as the error handling status of the VF 190. The PF#400 and the VF#410 are used to identify the VF 190. The state 620 retains any one of a state in which an error handling operation is unnecessary (normal), a state in which the resetting of the VF 190 becomes necessary due to the minor error (reset needed), and a state in which the replacement of the VF 190 becomes necessary due to the major error (replacement needed).

(3. Processing Performed by Hypervisor)

Next, an example of a processing performed by the hypervisor 20 is described hereinafter with reference to the flowchart.

(3.1. Outline of Processing Performed by Hypervisor)

Figure 7:
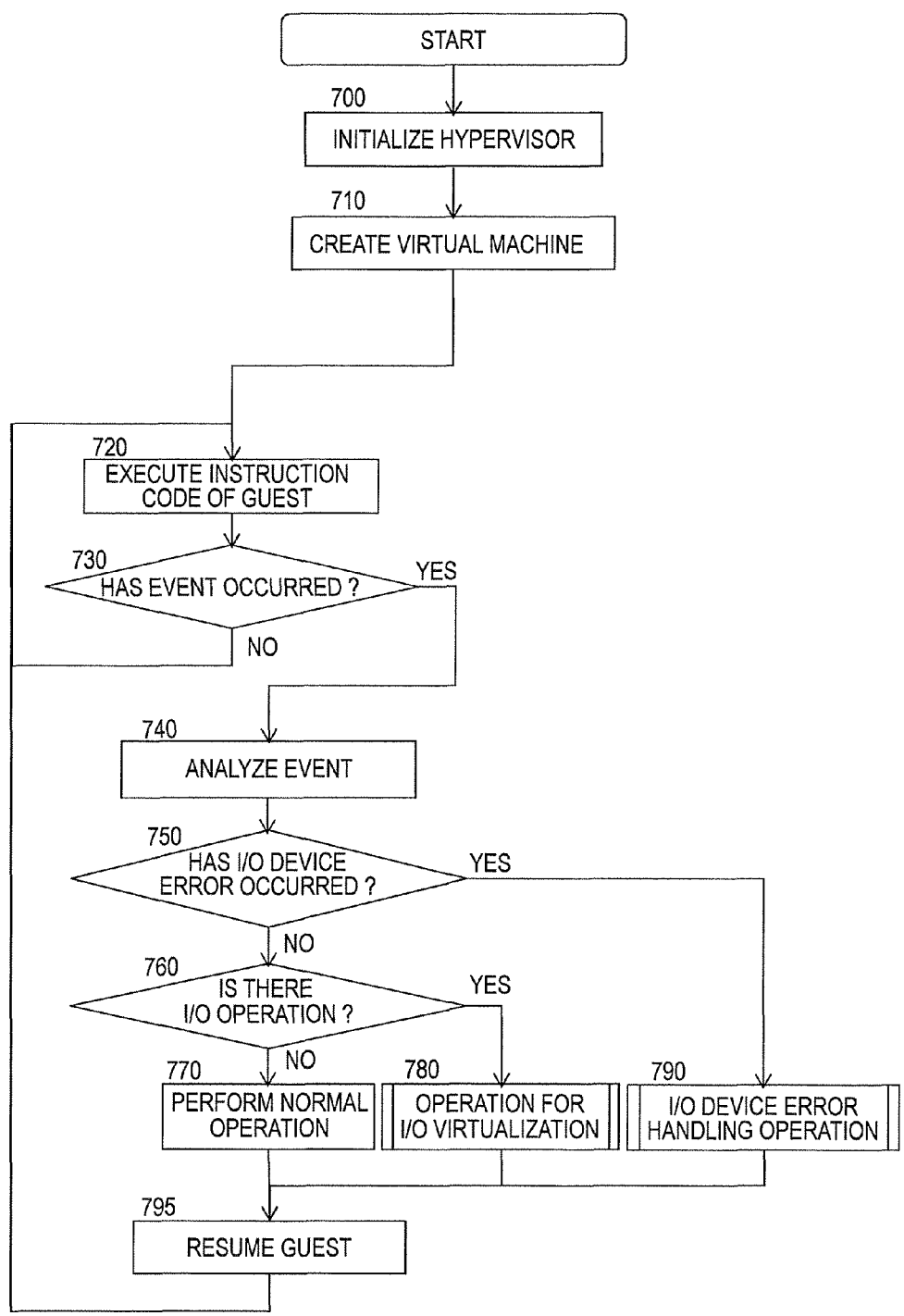
FIG. 7 is an example of a flowchart illustrating an overall image of the processing performed by the hypervisor according to the first embodiment.

FIG. 7 is an example of a flowchart illustrating an overall image of the processing performed by the hypervisor 20. When the physical machine 10 is powered on, the hypervisor 20 is loaded into the memory 90 to initialize the hypervisor 20 itself and the physical machine 10 and enable the IOV function of the I/O adapter 60 (700). In Step 700, the PF state table 214 has all the PFs initialized to the normal state, the VF state table 216 has all the VFs initialized to the normal state, and the adapter assignment table 200 has all the VFs initialized to "not assigned".

Subsequently, in response to an input from the console 80 or an assignment instruction at the previous startup, the hypervisor 20 creates the virtual machine 30 to which the VF 190 is assigned (710). In Step 710, a serial number (identifier) of the virtual machine 30 assigned in a row of the VF 190 within the adapter assignment table 200 is registered.

Subsequently, the hypervisor 20 starts operating the virtual machine 30, and executes the guest OS 40 and applications (hereinafter, both referred to generically as "guest") on the virtual machine 30 (720). In Step 720, the guest can execute an arbitrary instruction code, but each time one instruction is executed, the CPU 70 verifies whether or not there has occurred an event that needs the intermediation of the hypervisor 20 (730). If the event that needs the intermediation of the hypervisor 20 has occurred, the CPU 70 calls the hypervisor 20 to advance the procedure to Step 740. If the event that needs the intermediation of the hypervisor 20 has not occurred, the procedure returns to Step 720 in order to execute the subsequent instruction of the guest.

If the hypervisor 20 is called, the hypervisor 20 receives information on the event that has occurred from the CPU 70, analyzes the information, and acquires contents of the event (740).

Subsequently, the hypervisor 20 determines whether or not an error has occurred in the I/O adapter 60 (750), if the error has occurred in the I/O adapter 60, the procedure advances to Step 790 to perform an I/O device error handling operation. The I/O adapter 60 according to this embodiment generates an interrupt signal at the time of the occurrence of the error. The hypervisor 20 receives the interrupt signal as an event of the occurrence of the error.

On the other hand, if the error has not occurred in the I/O adapter 60, the hypervisor 20 advances the procedure to Step 760 to determine whether or not the guest has performed an I/O operation with respect to the virtual chipset 300 or the like. If the guest performs the I/O operation, the procedure advances to Step 780 to perform an operation for I/O virtualization. If the guest does not perform the I/O operation, the procedure advances to Step 770 to perform a normal operation (operation corresponding to the analyzed event) of the hypervisor 20. As the normal operation of the hypervisor 20, publicly-known or well-known operation may be carried out, and hence a description thereof is omitted.

When the operation corresponding to the event that has occurred is completed in any one of Steps 770, 780, and 790, the hypervisor 20 resumes the execution of the guest (795).

(3.2. I/O Device Error Handling Operation)

Figure 8:
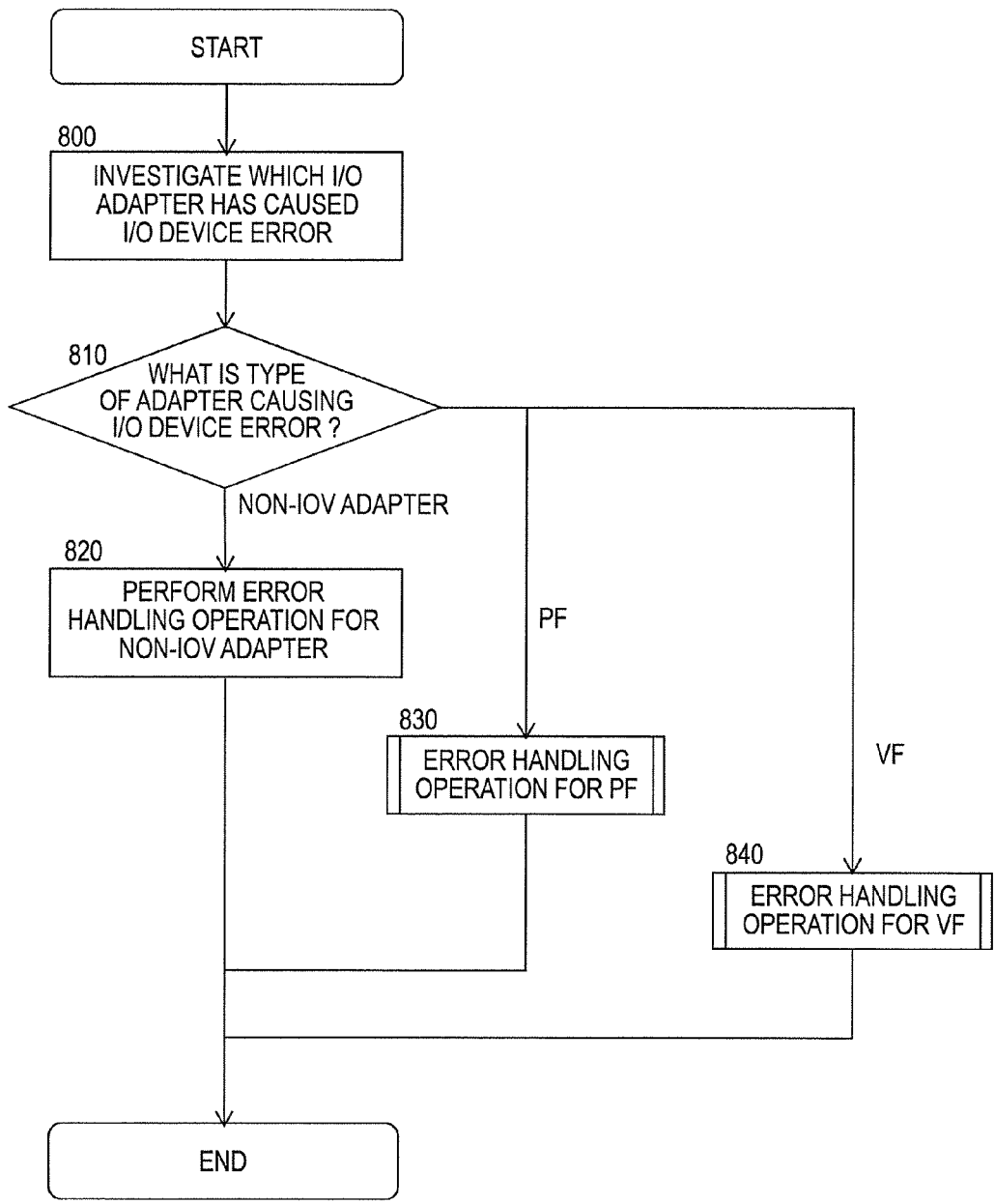
FIG. 8 is an example of a flowchart of the I/O device error handling operation performed in Step 790 of FIG. 7.

FIG. 8 is an example of a flowchart of the I/O device error handling operation performed in Step 790 of FIG. 7. The hypervisor 20 that has detected the occurrence of the error in the I/O adapter 60 references the AER register 180 included in the PF 160 or the VF 190 to investigate which I/O adapter 60 has caused the error (800).

Subsequently, the hypervisor 20 causes the processing to branch in accordance with the type of the I/O adapter 60 that has caused the error (810). If the error has occurred in the I/O adapter (non-IOV adapter) 60 incompatible with the IOV, the hypervisor 20 advances the procedure to Step 820 to perform an error handling operation for a non-IOV adapter. As the error handling operation for a non-IOV adapter, publicly-known or well-known operation may be carried out, and hence a description thereof is omitted.

If the error has occurred in a PF 160 part of the I/O adapter having the IOV function, the hypervisor 20 advances the procedure to Step 830 to perform an error handling operation for a PF in such a manner as described later. On the other hand, if the error has occurred in a VF 190 part of the I/O adapter having the IOV function, the hypervisor 20 advances the procedure to Step 840 to perform an error handling operation for a VF in such a manner as described later.

(3.2.1. Error Handling Operation for PF)

Figure 9:
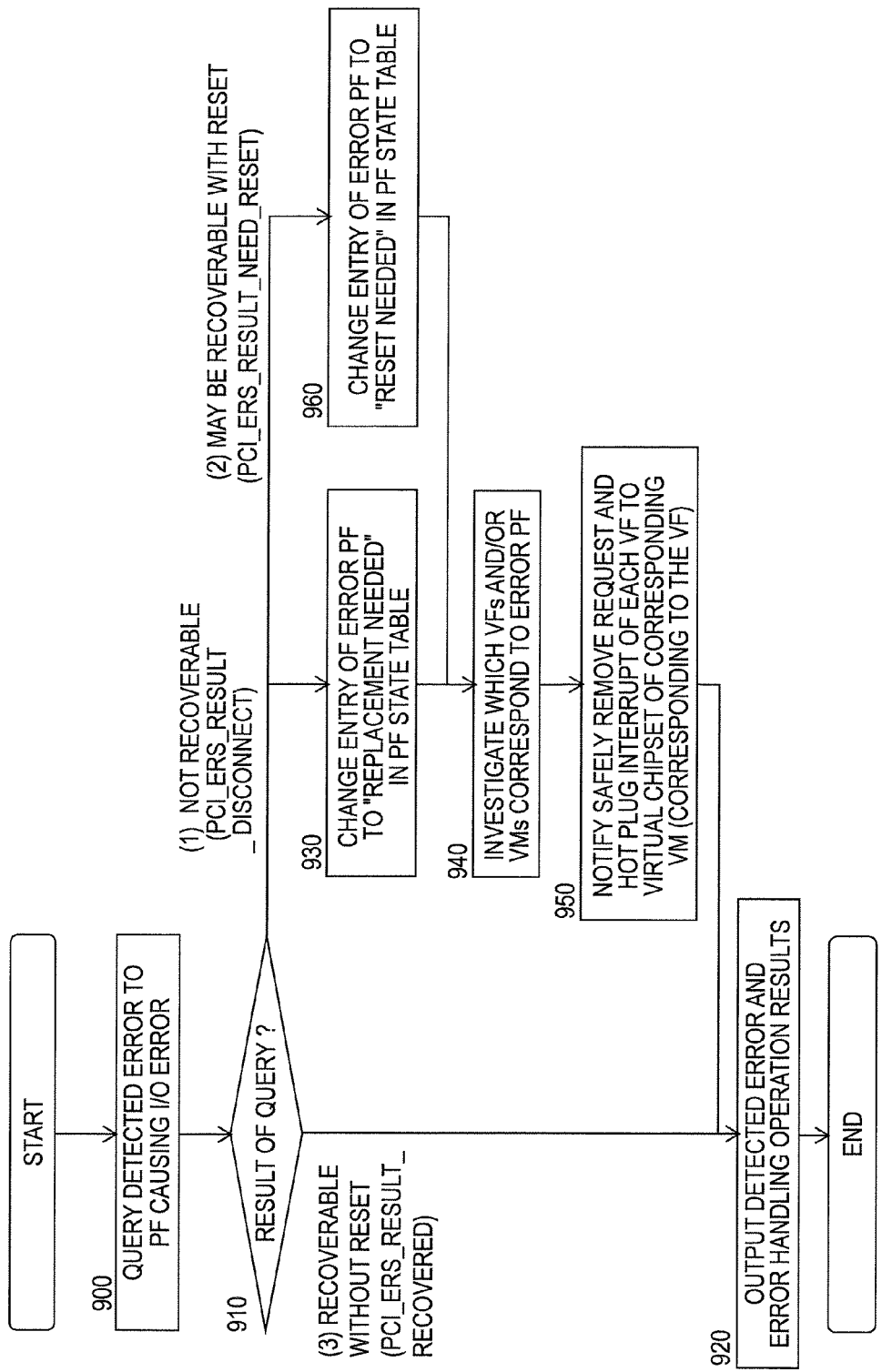
FIG. 9 is an example of a flowchart of the error handling operation for a PF performed in Step 830 of FIG. 8.

FIG. 9 is an example of a flowchart of the error handling operation for a PF performed in Step 830 of FIG. 8. The hypervisor 20 that has identified the PF 160 that has caused the error queries whether or not the error is recoverable to the PF driver 250 corresponding to the type of the PF 160, and acquires a significance of the error (900). The extent of the error of the I/O adapter 60 has three kinds of significances, and is classified into:

(1) the major error that is not recoverable and needs the replacement of the I/O adapter 60 (PCI_ERS_RESULT_DISCONNECT);

(2) the minor error that may be recoverable by resetting the PF 160 (PCI_ERS_RESULT_NEED_RESET); and (3) the error that is recoverable with a processing such as reconfiguration of a part of the register of the PF 160 (PCI_ERS_RESULT_RECOVERED), in order from the significant error.

The hypervisor 20 causes the processing to branch in accordance with the significance of the error (910).

(1) If the error is the major error that is not recoverable, the state 510 of an entry of the corresponding PF 160 within the PF state table 214 is changed to "replacement needed" (930).

(2) If the error is the minor error that may be recoverable with reset, the hypervisor 20 changes the state 510 of the entry of the corresponding PF 160 within the PF state table 214 to "reset needed" (960).

(3) If the error is recoverable, the recovery operation of the hypervisor 20 is omitted.

In the above-mentioned cases (1) and (2), the hypervisor 20 further references the adapter assignment table 200 to identify all the VFs 190 created from the PF 160 that has caused the error and the virtual machines 30 to which the respective VFs 190 are assigned (940).

Subsequently, the hypervisor 20 sets an active-time removal (hot remove) request of the VF 190 in the HP register 185 of the virtual chipset 300 included in each of the virtual machines 30. Then, the hypervisor 20 notifies the virtual machine 30 of a hot plug interrupt, and instructs the guest OS 40 to stop using the VF 190 and perform safe removal (safely remove) thereof (950).

Finally, the hypervisor 20 outputs detected error and error handling operation results to the console 80 (920). With the output to the console 80, maintenance personnel are prompted to perform maintenance of the I/O adapter 60. If the type of the error of the I/O adapter 60 is (2) or (3), it is not necessary to immediately perform the replacement of the I/O adapter 60, but a maintenance person is notified from the viewpoint of preventive maintenance in consideration of the possibility that the I/O adapter 60 may have deteriorated over time. On the other hand, if the type of the error is (1), the console 80 is notified that it is necessary to immediately perform the replacement of the I/O adapter 60.

(3.2.2. Error Handling Operation for VF)

Figure 10:
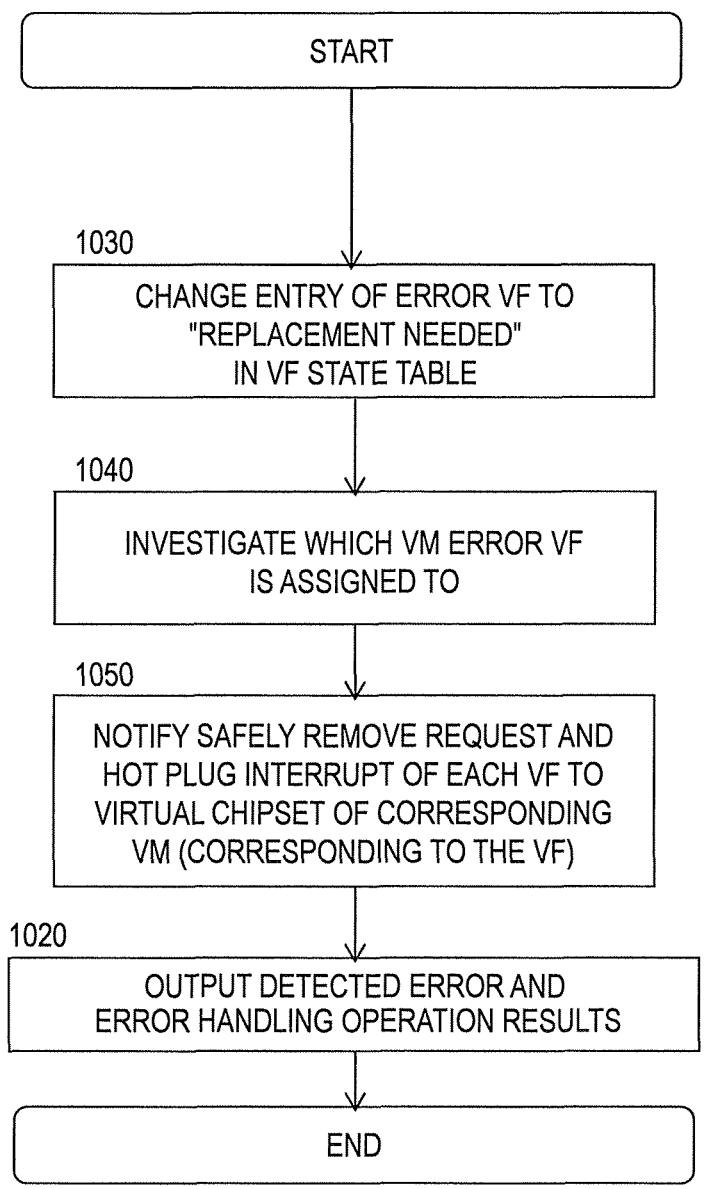
FIG. 10 is an example of a flowchart of the error handling operation for a VF performed in Step 840 of FIG. 8.

FIG. 10 is an example of a flowchart of the error handling operation for a VF performed in Step 840 of FIG. 8. The hypervisor 20 that has identified the VF 190 that has caused the error changes the entry of the corresponding VF 190 within the VF state table 216 to "replacement needed" (1060). In addition, the hypervisor 20 references the adapter assignment table 200 to identify the virtual machine 30 to which the VF 190 that has caused the error is assigned (1040).

Subsequently, the hypervisor 20 sets the active-time removal (hot remove) request of the VF 190 in the HP register 185 of the virtual chipset 300 included in the virtual machine 30. Then, the hypervisor 20 notifies the virtual machine 30 of the hot plug interrupt, and instructs the guest OS 40 to stop using the VF 190 and perform the safe removal (safely remove) thereof (1050).

Finally, the hypervisor 20 outputs and notifies the detected error and the error handling operation results to the console 80, and prompts the replacement of the I/O adapter 60 (1020). It is not necessary to immediately perform the replacement for a VF error, but the maintenance person is notified from the viewpoint of preventive maintenance in consideration of the possibility that the I/O adapter 60 may have deteriorated over time.

(3.3. Operation for I/O Virtualization)

Figure 11:
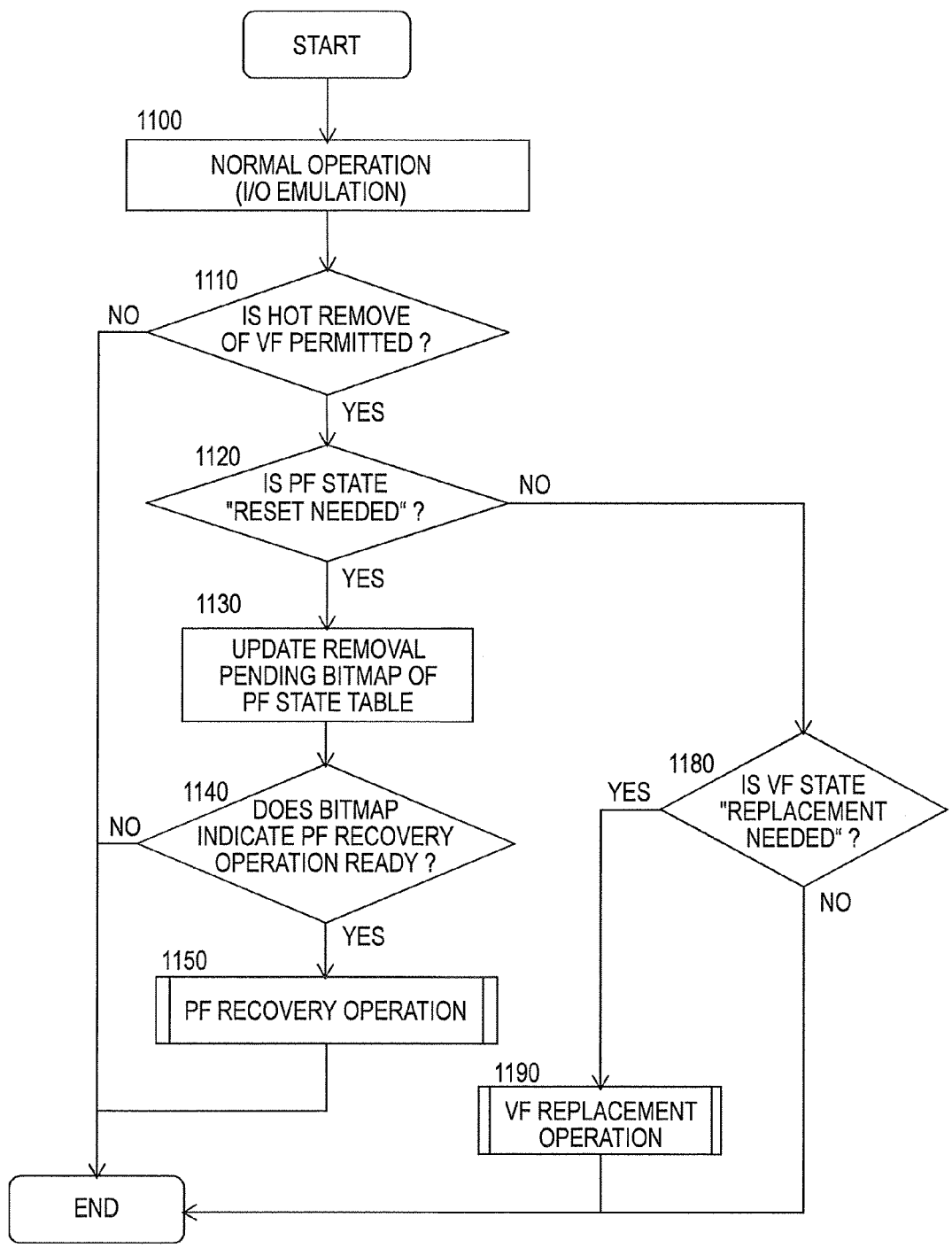
FIG. 11 is an example of a flowchart of the operation for I/O virtualization performed in Step 780 of FIG. 7.

FIG. 11 is an example of a flowchart of the operation for I/O virtualization performed in Step 780 of FIG. 7. The hypervisor 20 that has detected the I/O operation performed by the guest performs a normal I/O emulation operation in accordance with the operation subject (register of the virtual chipset 300 or the like) and the operation content (reading or writing) (1100). As the normal I/O emulation operation, publicly-known or well-known operation may be carried out, and hence a description thereof is omitted.

Subsequently, the hypervisor 20 determines whether or not the content of the I/O operation performed by the guest is to permit the removal (hot remove) of the VF 190 (1110). In other words, the hypervisor 20 waits until the guest permits the removal of the VF 190. It should be noted that the removal permission for the VF 190 is notified when the guest writes a permission response to the hot plug register 185 of the virtual chipset 300. If the value of the hot plug register 185 is a predetermined permission response, the hypervisor 20 determines that the content of the I/O operation performed by the guest is the removal permission for the VF 190. Only in this case, the hypervisor 20 references the PF state table 214 to determine whether or not the PF 160 that has created the VF 190 is reset-needed (1120).

If the PF 160 is reset-needed in Step 1120, with regard to the entry of the corresponding PF 160 within the PF state table 214, the hypervisor 20 changes the bit of the removal pending bitmap 520 corresponding to the VF 190 of which the removal permission has been obtained to "0" (1130).

Subsequently, the hypervisor 20 determines whether or not all the bits have become "0" in the removal pending bitmap 520 of the corresponding PF 160 within the PF state table 214 (1140). Only if all the bits become "0", the procedure advances to Step 1150 to perform a PF recovery operation.

If the PF 160 is not reset-needed in Step 1120, the hypervisor 20 references the VF state table 216 to determine whether or not the VF 190 of which the removal permission has been obtained is replacement-needed (1180). Only if the VF 190 is replacement-needed, the hypervisor 20 advances the procedure to Step 1190 to perform a VF replacement operation.

(3.3.1. PF Recovery Operation)

Figure 12:
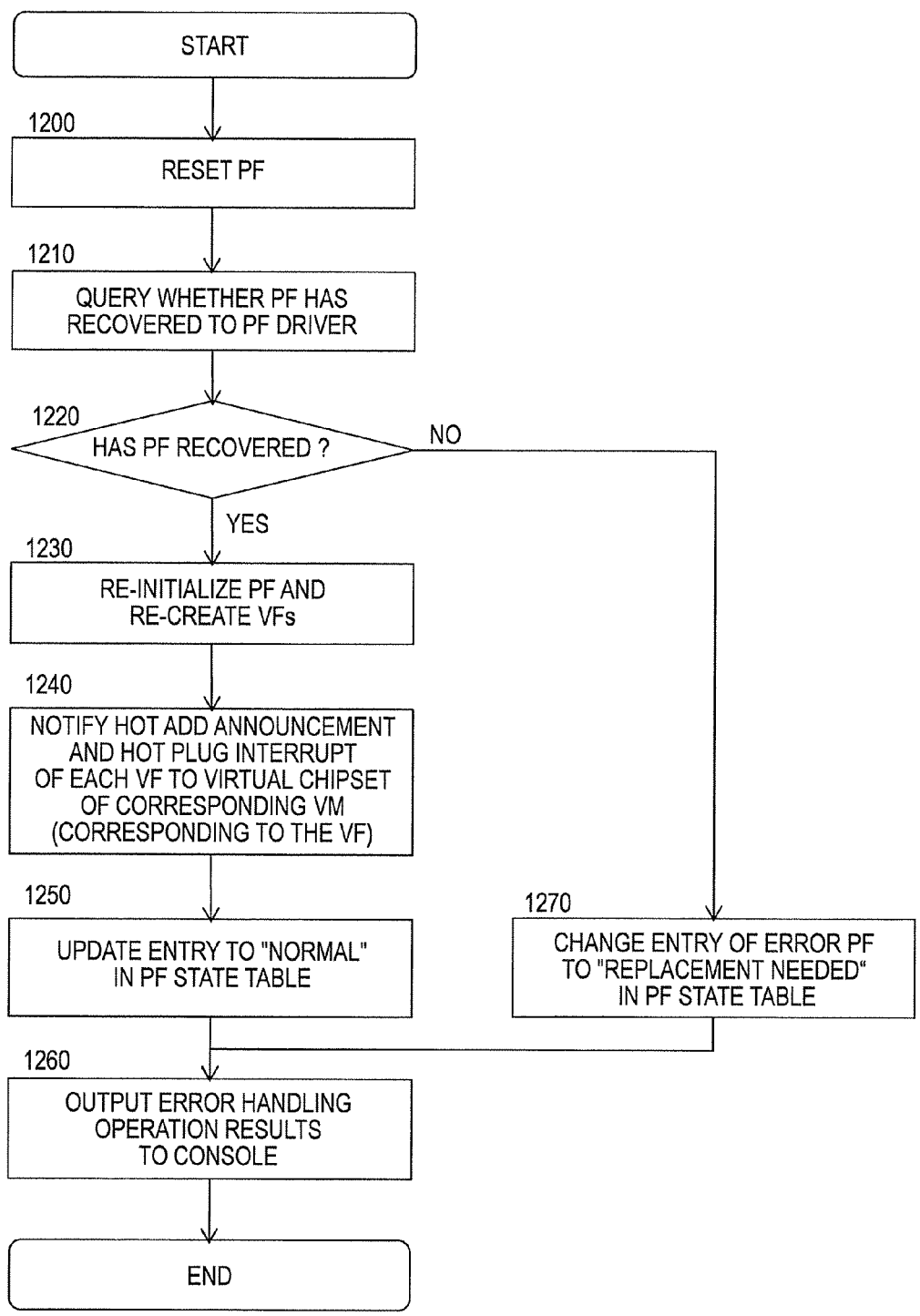
FIG. 12 is an example of a flowchart of the PF recovery operation performed in Step 1150 of FIG. 11.

FIG. 12 is an example of a flowchart of the PF recovery operation performed in Step 1150 of FIG. 11. The hypervisor 20 that has detected the removal permission from the guest OS 40 with regard to all the VFs 190 created from the reset-needed PF 160 resets the PF 160 (1200). With this operation, the PF 160, in other words, the I/O adapter 60 is reset and restarted.

Subsequently, the hypervisor 20 calls the PF driver 250 corresponding to the type of the reset PF 160, and queries whether or not the PF 160 has been successfully recovered to the I/O adapter 60 (1210). The hypervisor 20 causes the processing to branch in accordance with whether or not the PF 160 has been successfully recovered (1220).

If the recovery of the PF 160 is successful, the hypervisor 20 requests the PF driver 250 to re-initialize the PF 160, enables the IOV function again, and causes the PF 160 to re-create the VF 190 (1230). Subsequently, the hypervisor 20 references the adapter assignment table 200 to acquire which of the virtual machines 30 every VF 190 created from the PF 160 was assigned to before the occurrence of the error, and sets an active-time mounting (hot add) announcement (or notification) of the VF 190 in the HP register 185 of the virtual chipset 300 included in the virtual machines 30. Then, the hypervisor 20 notifies the virtual machines 30 of the hot plug interrupt to prompt the guest OS 40 to perform addition recognition (re-recognition) and initialization of the VF 190 and to start the use (1240). With this operation, the guest OS 40 that has received the hot plug interrupt reads the HP register 185 of the virtual chipset 300 to acquire the occurrence of hot add, and performs re-detection of the VF 190 re-created by the PF 160. The guest OS 40 restarts using the re-detected VF 190 by the VF driver 260 that has already been loaded.

Subsequently, the hypervisor 20 updates the state 510 of the entry corresponding to the PF 160 within the PF state table 214 to the normal state (1250).

On the other hand, if the recovery of the PF 160 fails in Step 1220, the hypervisor 20 changes the state 510 of the entry of an error PF within the PF state table 214 to "replacement needed" (1270). As the last step of the PF recovery operation performed by the hypervisor 20, the hypervisor 20 outputs the operation results to the console 80, and prompts the maintenance personnel to perform the replacement of the I/O adapter 60 (1260). It is not necessary to immediately perform the replacement if the recovery is successful, but the maintenance personnel are notified from the viewpoint of preventive maintenance in consideration of the possibility that the I/O adapter 60 may have deteriorated over time.

(3.3.2. VF Replacement Operation)

Figure 13:
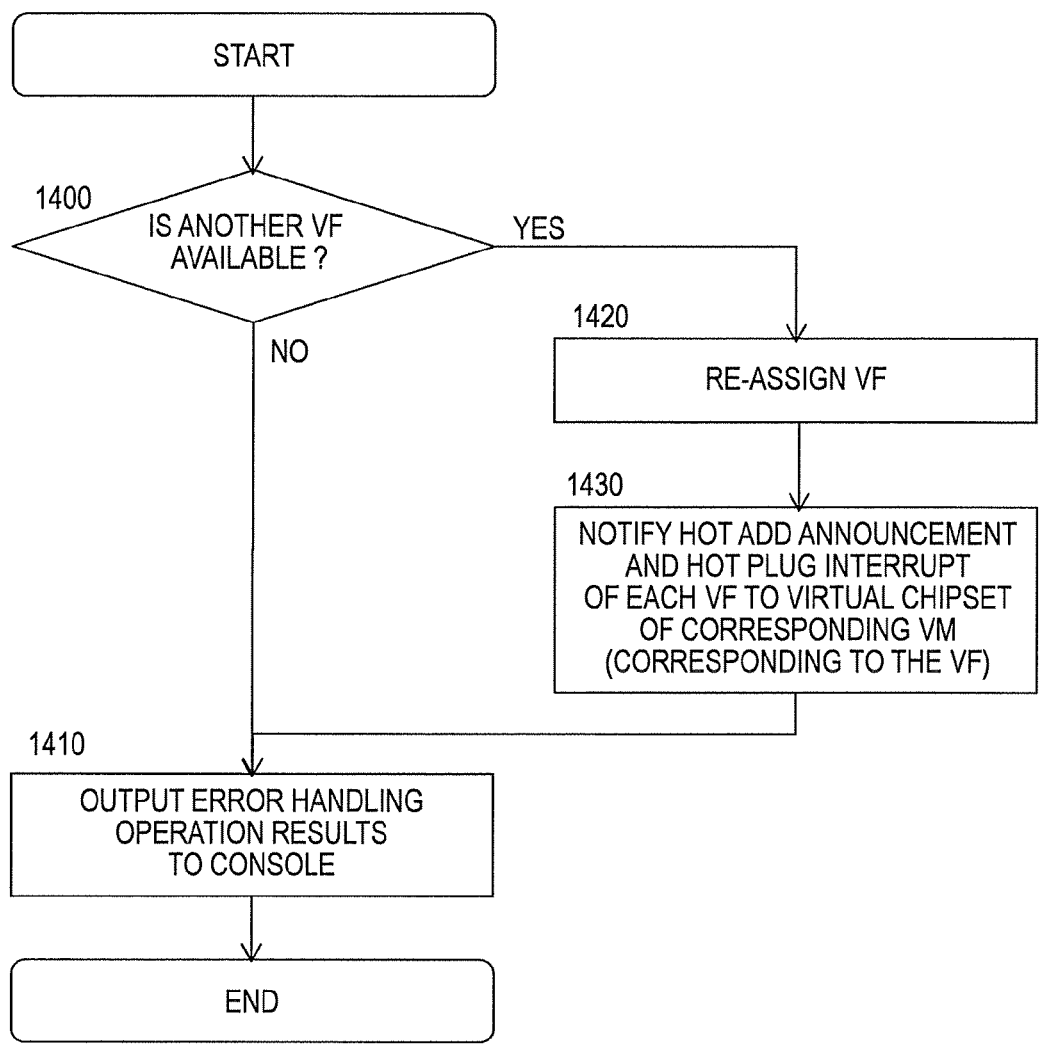
FIG. 13 is an example of a flowchart of a VF recovery operation performed in Step 1190 of FIG. 11.

FIG. 13 is an example of a flowchart of a VF recovery operation performed in Step 1190 of FIG. 11. The hypervisor 20 that has detected the removal permission from the guest OS 40 with regard to the replacement-needed VF 190 references the adapter assignment table 200 to determine whether or not another VF 190 created from the same PF 160 as the replacement-needed VF 190 can be assigned as an alternative VF (1400).

Only if the alternative VF can be assigned, the hypervisor 20 updates the adapter assignment table 200, and re-assigns the alternative VF to the virtual machine 30 on which the guest OS 40 is running (1420). Subsequently, the hypervisor 20 sets the active-time mounting (hot add) announcement of the alternative VF in the HP register 185 of the virtual chipset 300 included in the virtual machine 30. Then, the hypervisor 20 notifies the virtual machines 30 of the hot plug interrupt to prompt the guest OS 40 to perform the addition recognition and initialization of the alternative VF and to start the use (1430). With this operation, the guest OS 40 that has received the hot plug interrupt reads the HP register 185 of the virtual chipset 300 to acquire the occurrence of the hot add, and adds another VF 190 re-created by the PF 160. The guest OS 40 restarts using the alternative VF 190 by the VF driver 260 in accordance with the type of the added VF 190.

As the last step of the VF replacement operation performed by the hypervisor 20, the hypervisor 20 outputs the operation results to the console 80, and prompts the maintenance personnel to perform the replacement of the I/O adapter 60 (1410). It is not necessary to immediately perform the replacement if the recovery is successful, but the maintenance person is notified from the viewpoint of preventive maintenance in consideration of the possibility that the I/O adapter 60 may have deteriorated over time.

(4. Conclusion)

With the above-mentioned configurations and processings, it is possible to realize high performance because the guest OS 40 is caused to directly operate the VF 190 except for the time of the occurrence of the error.

If the minor error occurs in the PF 160, all the VFs 190 that disappear with the reset of the PF 160 can be hot-removed from the virtual machine 30 in advance to avoid the crashing of the guest OS 40, and hence it is possible to realize high reliability. Further, the PF 160 is recovered without the help of the maintenance personnel, and the re-created VF 190 is automatically hot-added to the virtual machine 30, and hence it is possible to facilitate the maintenance of the I/O adapter 60.

Further, also in the cases where the minor error and the major error have occurred in the VF 190, the hypervisor 20 hot-removes the VF 190 from the virtual machine 30 without the help of the maintenance personnel. Then, the hypervisor 20 re-assigns the alternative VF 190 and hot-adds the alternative VF 190 to the virtual machine 30. With this operation, the virtual machine 30 can be recovered with the alternative VF 190, and hence it is possible to realize the high reliability and ease of maintenance even in the event of an error caused in the VF 190.

Second Embodiment

In a second embodiment of this invention, descriptions are made of a configuration and an operation for a case where the hypervisor 20 utilizes the VF 190 to create an emulated function (hereinafter, referred to as "EF") 310 that provides a function of the VF 190 and assign the EF 310 to the virtual machine 30. In the second embodiment, instead of the guest OS 40, the hypervisor 20 directly operates the VF 190 to thereby allow a more suitable processing to handle the VF error. It should be noted that the EF 310 behaves as the virtual I/O adapter with respect to the guest in the same manner as the VF 190.

(5. Hardware Configuration)

A computer system according to the second embodiment has the same hardware configuration as that of the first embodiment illustrated in FIG. 1, and hence the description thereof is omitted.

(6. Software Configuration)

Figure 14:
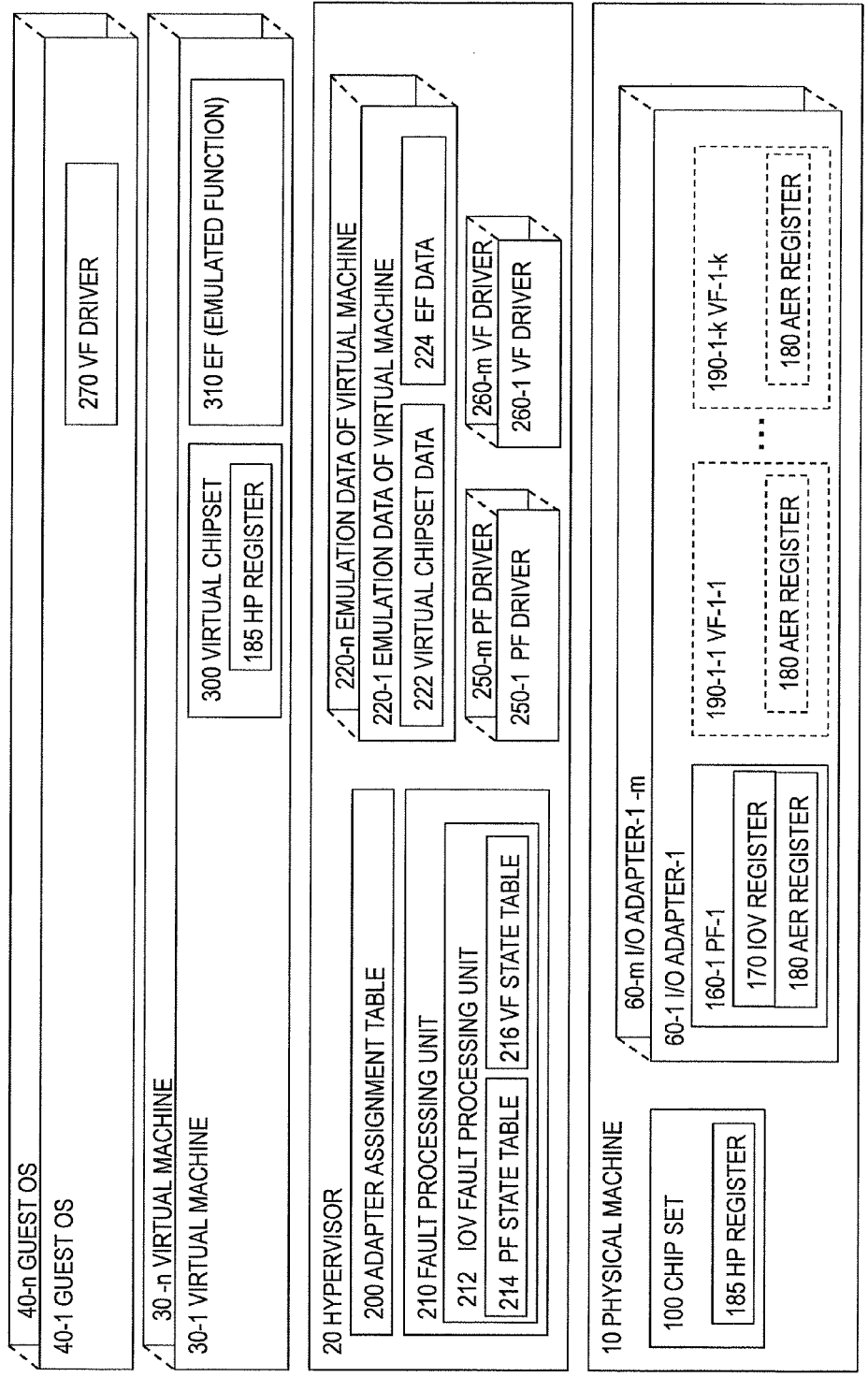
FIG. 14 is a block diagram illustrating a relationship between the physical machine and software according to a second embodiment.

Next, referring to FIG. 14, detailed descriptions are made of main portions of a software configuration which realize the virtual machine 30 on the physical machine 10 and hardware components to be controlled. The descriptions of the same components denoted by the same reference numerals as those of the first embodiment described with reference to FIG. 2 are omitted.

The physical machine 10 is the same as that of the first embodiment. The hypervisor 20 uses an arbitrary VF 190 to create the EF 310 and assign the EF 310 to an arbitrary virtual machine 30. The EF 310 corresponds to the VF 190 on a one-to-one basis, and provides the same function as the VF 190. An interface of the EF 310 which provides a function may be different from that of the VF 190. In order to use the VF 190, the hypervisor 20 retains the VF driver 260 (VFs 260-1 to 260-*m*) corresponding to the type of the VF 190. Further, in order to realize the EF 310, the hypervisor 20 retains EF data 224 inside the emulation data 220 of the virtual machine 30.

The virtual machine 30 includes the virtual part such as the virtual chipset 300 provided by the hypervisor 20 and the EF 310. The virtual machine 30 has the guest OS 40 run thereon. The guest OS 40 operates the EF 310 by using a virtual adapter driver 270 corresponding to the EF 310.

Figure 15:
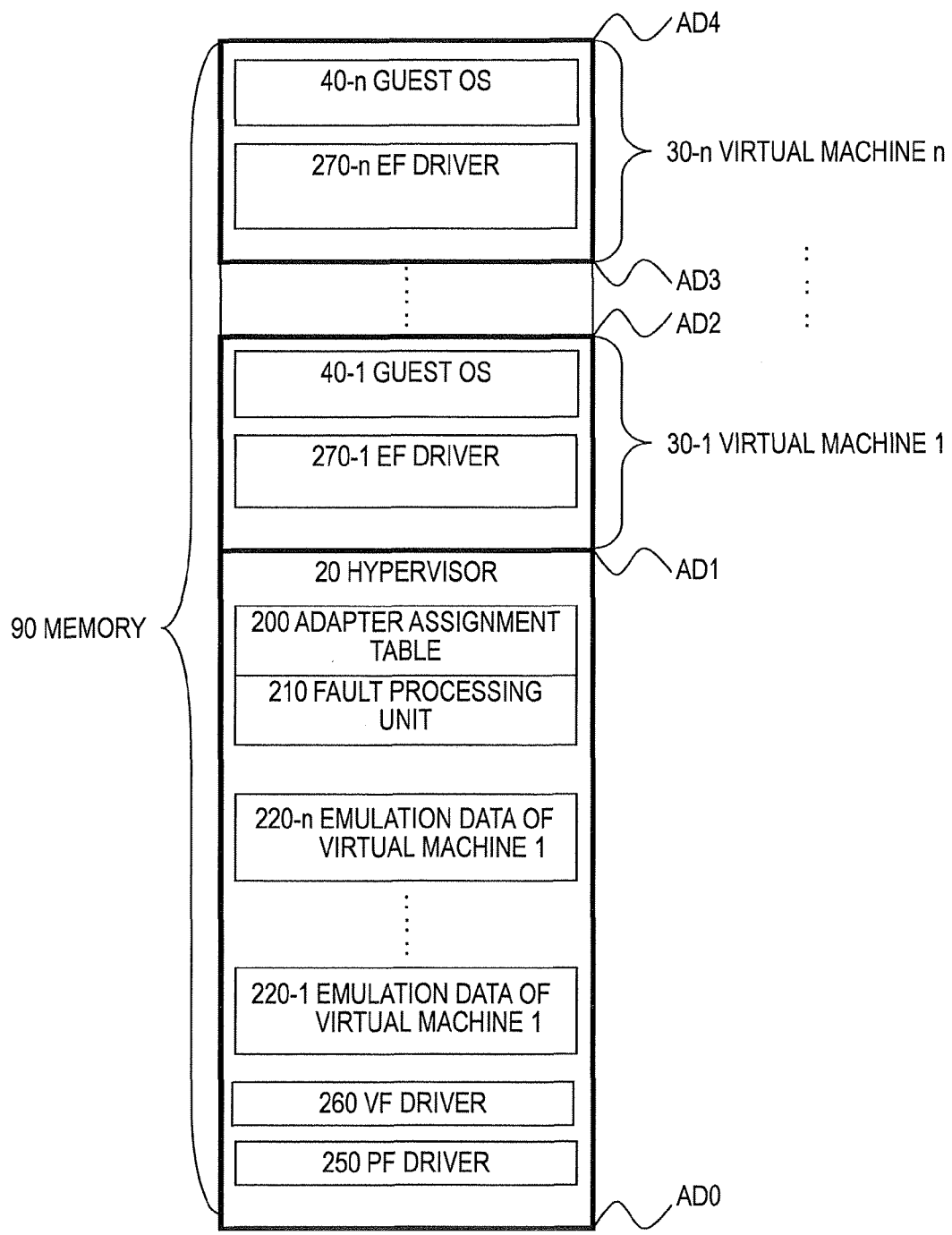
FIG. 15 illustrates an example of the memory managed by the hypervisor software according to the second embodiment.

FIG. 15 illustrates an example of the memory 90 managed by the hypervisor 20. The descriptions of the same components as those of the first embodiment illustrated in FIG. 3 are omitted. Stored in the area for each of the virtual machines 30 are the guest OS 40 and the virtual adapter driver 270.

Stored in the area used by the hypervisor 20 are not only the adapter assignment table 200, the fault processing unit 210, the emulation data 220 of the virtual machine, and the PF driver 250, but also the VF driver 260.

The adapter assignment table 200 has the same structure as that of the first embodiment illustrated in FIG. 4, and hence the description thereof is omitted. Further, the PF state table 214 has the same structure as that of the first embodiment illustrated in FIG. 5, and hence the description thereof is omitted.

The VF state table 216 is structured so that the VF 190 corresponds to the EF 310 on a one-to-one basis, and hence the EF 310 is assigned the same serial number as the VF 190. Therefore, in the second embodiment, the VF#410 of the first embodiment illustrated in FIG. 6 also means a virtual adapter #.

(7. Processing Performed by Hypervisor)

Next, an example of the processing performed by the hypervisor 20 is described hereinafter with reference to the flowchart.

(7.1. Outline of Processing Performed by Hypervisor)

The flowchart illustrating the overall image of the processing performed by the hypervisor 20 is the same as that of the first embodiment illustrated in FIG. 7, and hence the description thereof is omitted.

(7.2. I/O Device Error Handling Operation)

The I/O device error handling operation performed in Step 790 of FIG. 7 is the same as the processing of the first embodiment illustrated in FIG. 8, and hence the description thereof is omitted.

(7.2.1. Error Handling Operation for PF)

Figure 16:
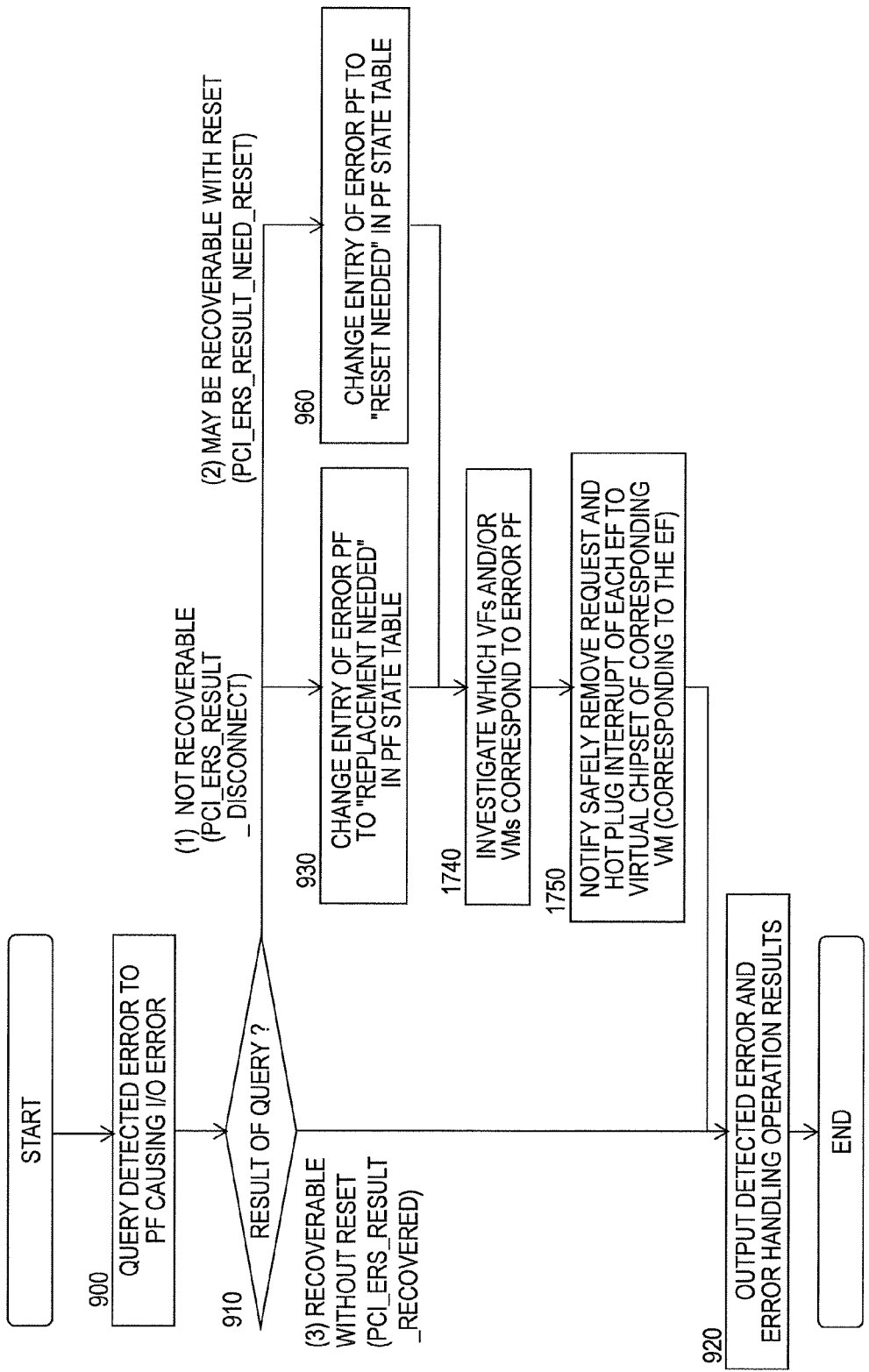
FIG. 16 is an example of a flowchart of the error handling operation for a PF performed in Step 830 of FIG. 8 according to the second embodiment.

FIG. 16 is an example of a flowchart of the error handling operation for a PF performed in Step 830 of FIG. 8. The descriptions of the same steps denoted by the same reference numerals as those of the first embodiment illustrated in FIG. 9 are omitted.

In the second embodiment, in the cases (1) the major error and (2) the minor error described in the first embodiment, the hypervisor 20 further references the adapter assignment table 200 to identify all the VFs 190 created from the PF 160 that has caused the error and the virtual machines 30 to which the EFs 310 corresponding to the respective VFs 190 on a one-to-one basis are assigned (1740).

Subsequently, the hypervisor 20 sets the active-time removal (hot remove) request of the EF 310 in the HP register 185 of the virtual chipset 300 included in each of the virtual machines 30. The hypervisor 20 notifies the virtual machine 30 of the hot plug interrupt, and instructs the guest OS 40 to perform the safe removal (safely remove) of the EF 310 (1750).

(7.2.2. Error Handling Operation for VF)

Figure 17:
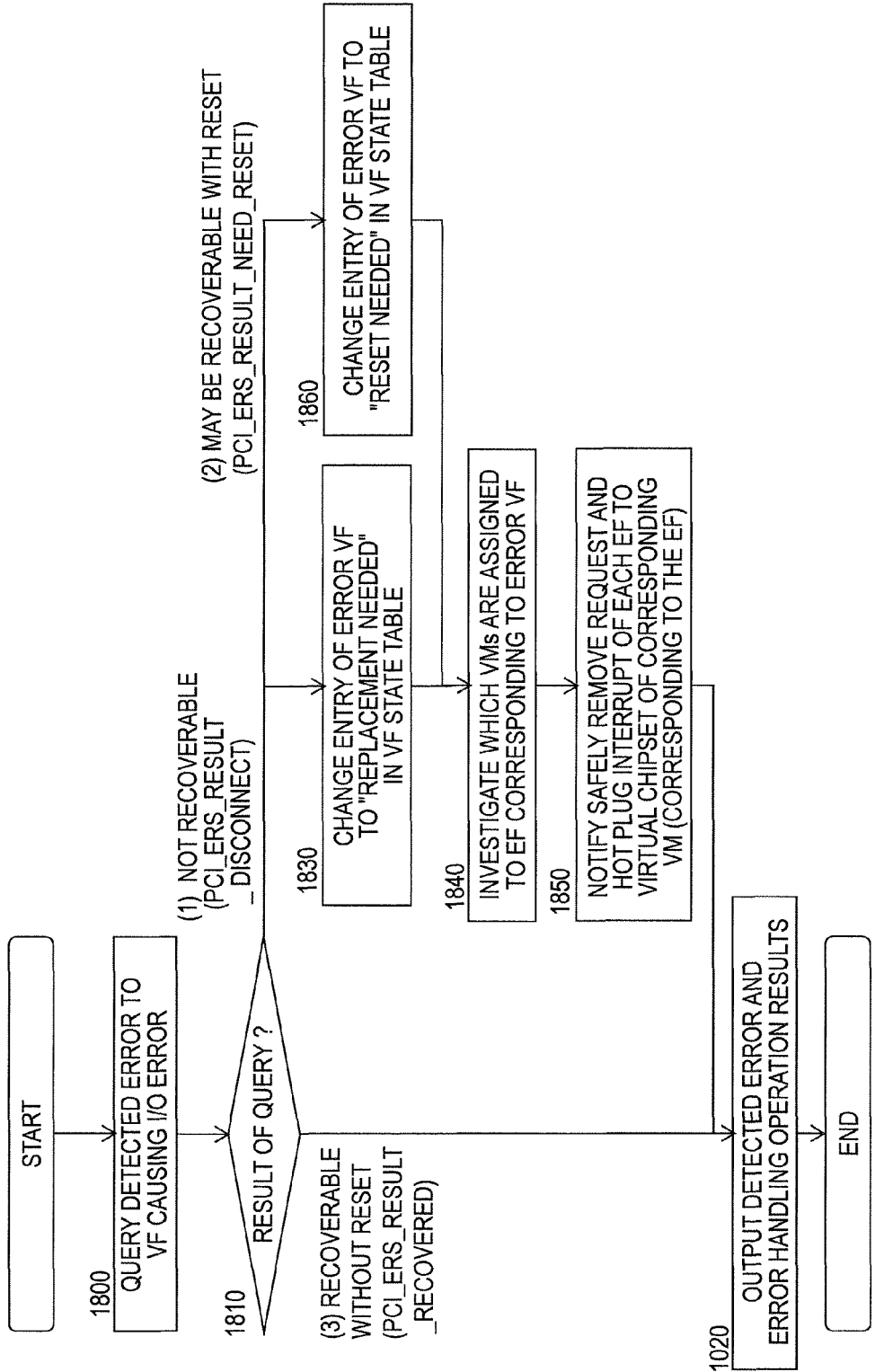
FIG. 17 is an example of a flowchart of the error handling operation for a VF performed in Step 840 of FIG. 8 according to the second embodiment.

FIG. 17 is an example of a flowchart of the error handling operation for a VF performed in Step 840 of FIG. 8. It should be noted that hereinafter, the descriptions of the same steps denoted by the same reference numerals as those of the first embodiment illustrated in FIG. 10 are omitted.

The hypervisor 20 that has identified the VF 190 that has caused the error queries whether or not the error is recoverable to the VF driver 260 corresponding to the type of the VF 190, and acquires the significance of the error (1800). The extent of the error of the I/O adapter 60 has three kinds of significances as described in the first embodiment, and is classified into: (1) the major error that is not recoverable and needs the replacement of the VF 190; (2) the minor error that may be recoverable by resetting the VF 190; and (3) the error that is recoverable by means such as reconfiguration of a part of the register of the VF 190, in order from the significant error.

The hypervisor 20 causes the processing to branch in accordance with the significance of the error of the I/O adapter 60 (1810). (1) If the error is the major error that is not recoverable, the state 620 of an entry of the corresponding VF 190 within the VF state table 216 is changed to "replacement needed" (1830). (2) If the error is the minor error that may be recoverable with reset, the state 620 of the entry of the corresponding VF 190 within the VF state table 216 is changed to "reset needed" (1860). (3) If the error is recoverable, the recovery operation of the hypervisor 20 is omitted.

In the cases where the above-mentioned extent of the error is (1) and (2), the hypervisor 20 further references the adapter assignment table 200 to identify the EF 310 corresponding to the VF 190 that has caused the error on a one-to-one basis and the virtual machine 30 to which the EF 310 is assigned (1840).

Subsequently, the hypervisor 20 sets the active-time removal (hot remove) request of the EF 310 in the HP register 185 of the virtual chipset 300 included in each of the virtual machines 30. Then, the hypervisor 20 notifies the virtual machine 30 of the hot plug interrupt, and instructs the guest OS 40 to stop using the EF 310 and perform the safe removal (safely remove) thereof (1850).

(7.3.1. Operation for I/O Virtualization)

Figure 18:
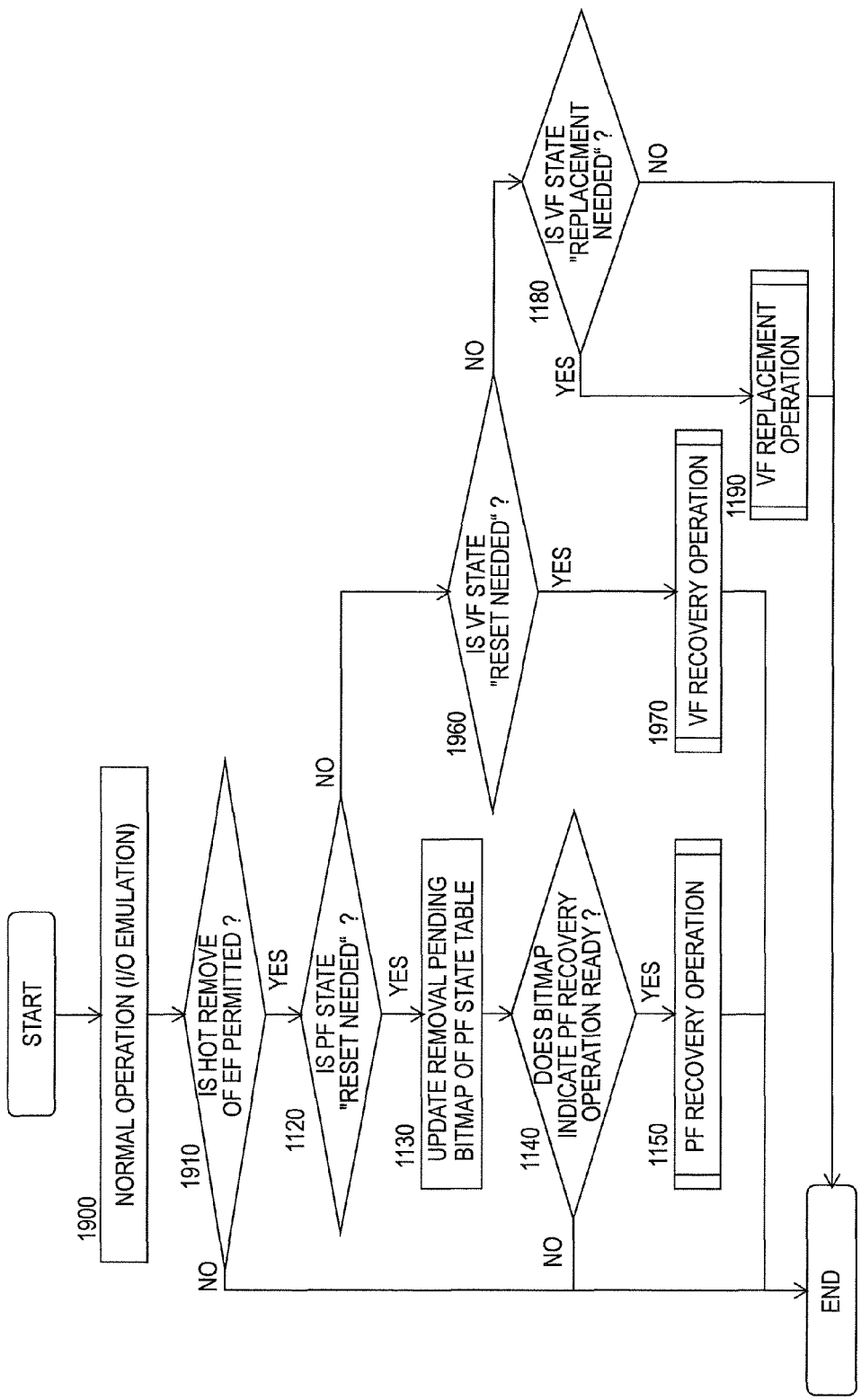
FIG. 18 is an example of a flowchart of the operation for I/O virtualization performed in Step 780 of FIG. 7 according to the second embodiment.

FIG. 18 is an example of a flowchart of the operation for I/O virtualization performed in Step 780 of FIG. 7. Hereinafter, the descriptions of the same steps denoted by the same reference numerals as those of the first embodiment illustrated in FIG. 11 are omitted.

The hypervisor 20 that has detected the I/O operation performed by the guest performs the normal I/O emulation operation in accordance with the operation subject (register of the virtual chipset 300 or the like) and the operation content (reading or writing) (1900). In this case, the interface of the EF 310 is operated, the hypervisor 20 operates the interface having the same function of the VF 190 instead.

Subsequently, the hypervisor 20 determines whether or not the content of the I/O operation performed by the guest is to permit the removal (hot remove) of the EF 310 (1910). Only if the content of the I/O operation performed by the guest is the removal permission for the VF 190, the hypervisor 20 references the PF state table 214 to determine whether or not the PF 160 that has created the VF 190 is reset-needed (1120).

If the PF 160 is not reset-needed in Step 1120, the hypervisor 20 references the VF state table 216 to determine whether or not the VF 190 corresponding on a one-to-one basis to the EF 310 of which the removal permission has been obtained is reset-needed (1960). Only if the VF 190 is reset-needed, the procedure advances to Step 1970 to perform the VF recovery operation.

(7.3.1. PF Recovery Operation)

Figure 19:
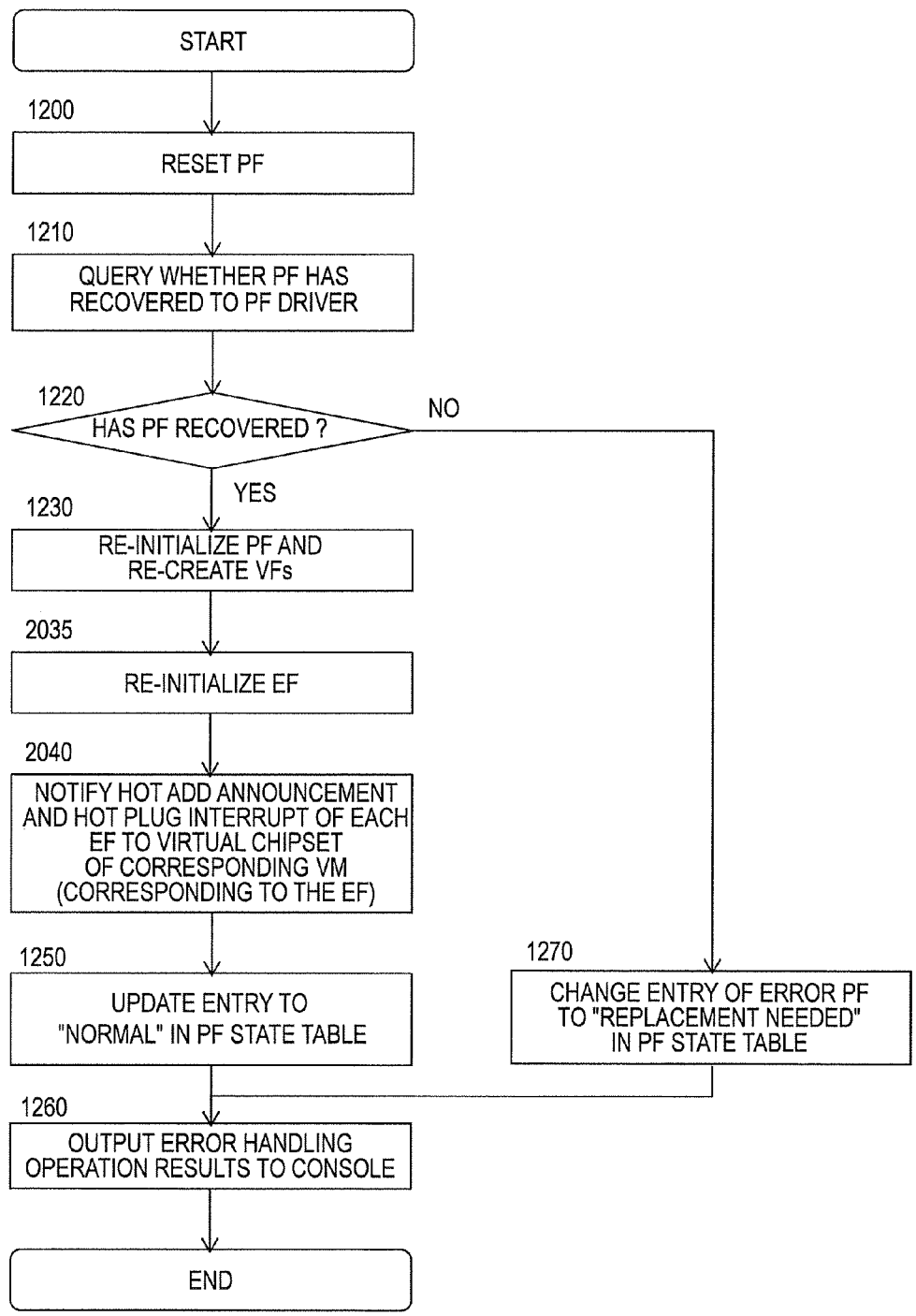
FIG. 19 is an example of a flowchart of the PF recovery operation performed in Step 1150 of FIG. 18 according to the second embodiment.

FIG. 19 is an example of a flowchart of the PF recovery operation performed in Step 1150 of FIG. 18. Hereinafter, the descriptions of the same steps denoted by the same reference numerals as those of the first embodiment illustrated in FIG. 12 are omitted.

If the recovery of the PF 160 is successful, the hypervisor 20 requests the PF driver 250 to re-initialize the PF 160, enables the IOV function again, and causes the VF 190 to be re-created (1230). Subsequently, the hypervisor 20 references the adapter assignment table 200 to acquire which of the virtual machines 30 the EF 310 corresponding on a one-to-one basis to every VF 190 created from the PF 160 was assigned to before the occurrence of the error. Then, the hypervisor 20 causes the virtual machine 30 corresponding to the EF 310 to re-initialize the EF 310 (2035). In addition, the hypervisor 20 sets the active-time mounting (hot add) announcement (or notification) of the EF 310 in the HP register 185 of the virtual chipset 300 included in the virtual machine 30. Then, the hypervisor 20 notifies the virtual machine 30 of the hot plug interrupt to prompt the guest OS 40 to perform the addition recognition and initialization of the EF 310 and to start the use (2040).

(7.3.2. VF Recovery Operation)

Figure 20:
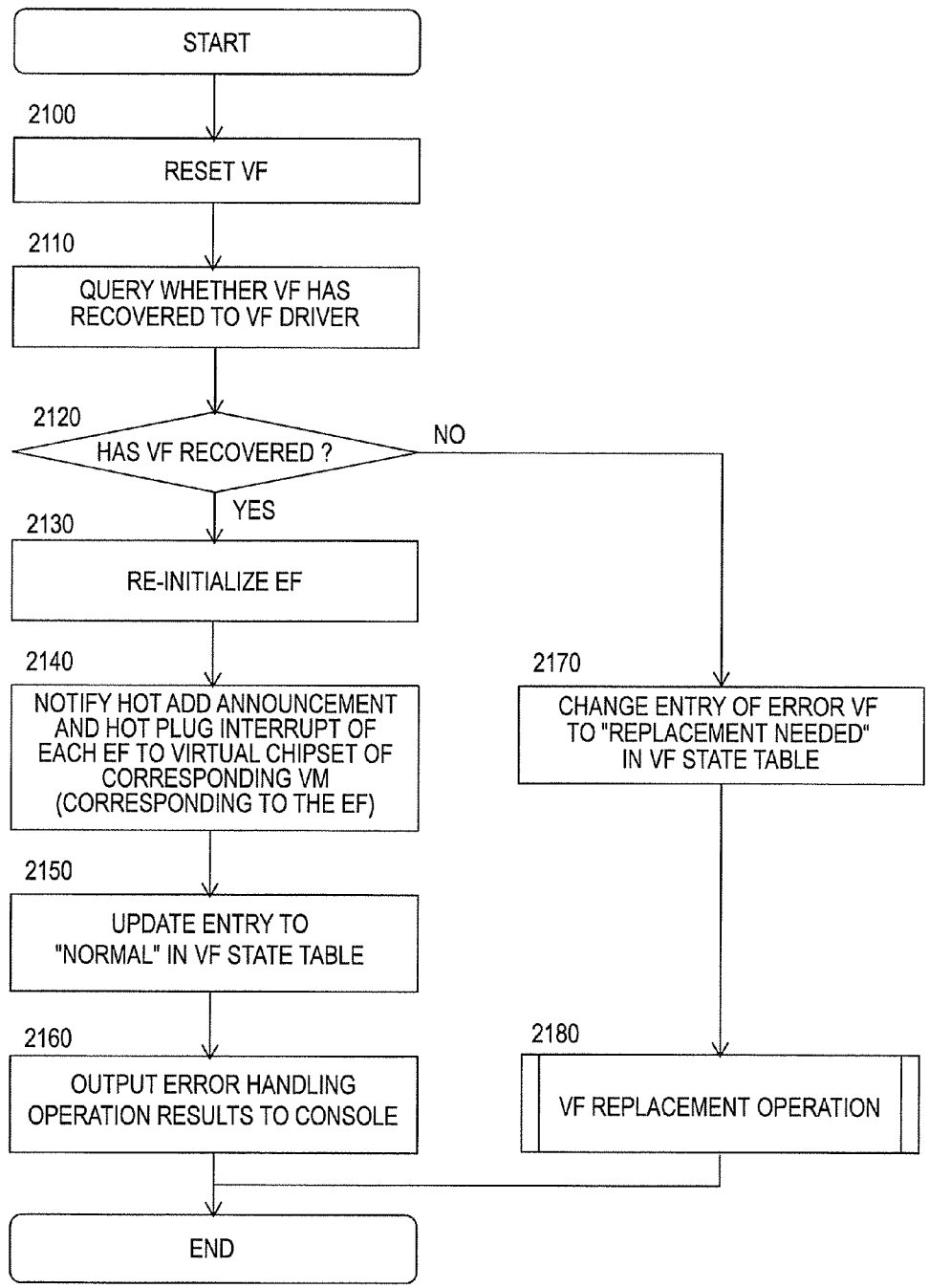
FIG. 20 is an example of a flowchart of the VF recovery operation performed in Step 1970 of FIG. 18 according to the second embodiment.

FIG. 20 is an example of a flowchart of the VF recovery operation performed in Step 1970 of FIG. 18. The hypervisor 20 that has detected the removal permission from the guest OS 40 with regard to the EF 310 corresponding to the reset-needed VF 190 on a one-to-one basis resets the VF 190 (2100).

Subsequently, the hypervisor 20 calls the VF driver 260 corresponding to the type of the VF 190, and queries whether or not the VF 190 has been successfully recovered to the VF driver 260 (2110). The hypervisor 20 causes the processing to branch in accordance with whether or not the VF 190 has been successfully recovered (2120).

If the recovery of the VF 190 is successful, the hypervisor 20 instructs the virtual machine 30 to re-initialize the EF 310 (2130). Subsequently, the hypervisor 20 sets the active-time mounting (hot add) announcement (or notification) of the EF 310 in the HP register 185 of the virtual chipset 300 included in the virtual machine 30 including the EF 310. Then, the hypervisor 20 notifies the virtual machine 30 of the hot plug interrupt to prompt the guest OS 40 to perform the addition recognition and initialization of the EF 310 and to start the use (2140). With this operation, the guest OS 40 that has received the hot plug interrupt reads the HP register 185 of the virtual chipset 300 to acquire the occurrence of the hot add, adds the initialized EF 310, and restarts using the EF 310 by the virtual adapter driver 270.

Subsequently, the hypervisor 20 updates the state 620 of the entry corresponding to the VF 190 within the VF state table 216 to the normal state (2150). Finally, the hypervisor 20 outputs the operation results to the console 80, and prompts the maintenance personnel to perform the replacement of the I/O adapter 60 (2160). It is not necessary to immediately perform the replacement if the recovery is successful, but the maintenance person is notified from the viewpoint of preventive maintenance in consideration of the possibility that the I/O adapter 60 may have deteriorated over time.

On the other hand, if the recovery of the VF 190 fails in Step 2120, the hypervisor 20 changes the state 620 of the entry of an error VF within the VF state table 216 to "replacement needed" (2170). Subsequently, the hypervisor 20 performs the VF replacement operation (2180).

(7.3.3. VF Replacement Operation)

Figure 21:
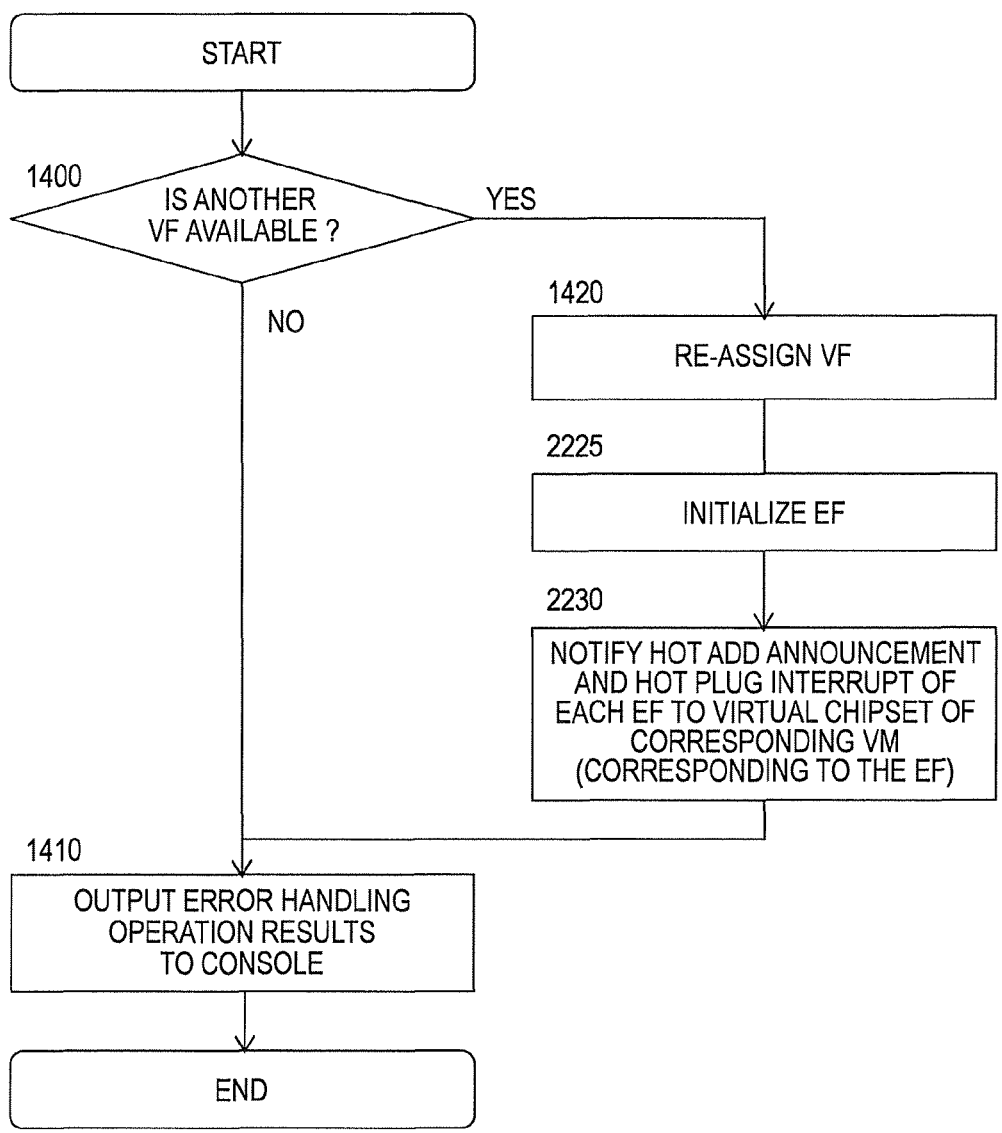
FIG. 21 is an example of a flowchart of the VF replacement operation performed in Step 1190 of FIG. 18 and Step 2180 of FIG. 20 according to the second embodiment.

FIG. 21 is an example of a flowchart of the VF replacement operation performed in Step 1190 of FIG. 18 and Step 2180 of FIG. 20. Hereinafter, the descriptions of the same steps denoted by the same reference numerals as those of the first embodiment illustrated in FIG. 13 are omitted.

After the alternative VF is re-assigned to the virtual machine 30 in Step 1420, the hypervisor 20 initializes the alternative EF 310 corresponding to the alternative VF on a one-to-one basis (2225). In addition, the hypervisor 20 sets the active-time mounting (hot add) announcement (or notification) of an alternative EF 310 in the HP register 185 of the virtual chipset 300 included in the virtual machine 30. Then, the hypervisor 20 notifies the virtual machine 30 of the hot plug interrupt to prompt the guest OS 40 to perform the addition recognition and initialization of the alternative EF 310 and to start the use (1430).

(8. Conclusion)

With the above-mentioned configurations and processings, it is possible to realize relatively high performance, even though the performance is lower than that of the first embodiment, because the processing performed by the hypervisor 20 is limited to the interface conversion between the EF 310 and the VF 190.

If the minor error occurs in the PF 160, all the VFs 190 that disappear with the reset of the PF 160 can be hot-removed from the virtual machine 30 in advance to avoid the crashing of the guest OS 40, and hence it is possible to realize the high reliability. Further, the PF 160 is recovered without the help of the maintenance personnel, and the re-created VF 190 is automatically hot-added to the virtual machine 30, and hence it is possible to realize the ease of maintenance.

Further, also in the cases where the minor error and the major error have occurred in the VF 190, it is possible to hot-remove the VF 190 from the virtual machine 30 without the help of the maintenance personnel and handle the error in accordance with the significance thereof by resetting or replacing the VF 190. Then, the EF 310 is hot-added to the virtual machine 30 to recover the virtual machine, and hence it is possible to realize the high reliability and the ease of maintenance even in the event of an error caused in the VF 190.

It should be noted that in the above-mentioned respective embodiments, the example of employing a hypervisor as the virtualization unit that creates the virtual machine on the physical machine 10 is described, but a virtual machine monitor (VMM) may be used.

Further, in the above-mentioned respective embodiments, the example in which the chipset 100 exists on the physical machine 10 independently of the CPU 70 is described, but the functions of the chipset 100 may be included in the CPU 70.

As described above, this invention can be applied to a virtual machine including the I/O adapter having the IOV function and an AER function and a management system for the virtual machine.

While the present invention has been described in detail and pictorially in the accompanying drawings, the present invention is not limited to such detail but covers various obvious modifications and equivalent arrangements, which fall within the purview of the appended claims.

What is claimed is:

1. A method of controlling a virtual machine of a computer, the computer comprising:
   a physical machine comprising a processor, a memory, and an I/O adapter having a physical function that creates a virtual I/O adapter as a virtual function;
   a virtualization unit that provides computer resources of the physical machine to the virtual machine; and
   an OS that is executed on the virtual machine, the virtualization unit creating at least one virtual machine to which the virtual function is assigned, the at least one virtual machine running the OS thereon, and the I/O adapter comprises an error information register that stores error information,
   the method comprising:
   a first step of detecting, by the virtualization unit, a state change of the I/O adapter;
   a second step of identifying, by the virtualization unit, when a state of the I/O adapter becomes a predetermined state, the virtual machine to which the virtual function created by the physical function is assigned; and
   a third step of notifying, by the virtualization unit, the OS running on the identified virtual machine of the state of the I/O adapter,
   wherein,
   the first step comprises:
      a fourth step of receiving, by the virtualization unit, a signal indicating an error that has occurred in the I/O adapter; and
      a fifth step of referencing, by the virtualization unit, the error information register when the signal indicating the error is received, thereby detecting the state change of the I/O adapter from the error information;
   the method further comprises a sixth step of stopping, by the OS, using the virtual function;
   the virtual machine comprises a hot plug register that stores a mounting/removing request and a mounting/removing notification of the I/O adapter;
   the second step comprises performing the identifying for all the virtual functions; and
   the sixth step comprises:
      a seventh step of setting, by the virtualization unit, a removal request of the virtual function in the hot plug register;
      an eighth step of reading, by the OS, the hot plug register; and
      a ninth step of waiting until every OS running on the identified virtual machine responds to the removal request of the virtual function set in the hot plug register.

2. The method of controlling a virtual machine according to claim 1, further comprising:
   a tenth step of re-initializing, by the virtualization unit, the I/O adapter after the OS stops using the virtual function;
   an eleventh step of re-creating, by the I/O adapter, the virtual function;
   a twelfth step of setting, by the virtualization unit, a mounting notification of the I/O adapter in the hot plug register;
   a thirteenth step of reading, by the OS, the hot plug register to detect mounting of the I/O adapter; and
   a fourteenth step of restarting, by the OS, using the virtual function.

3. The method of controlling a virtual machine according to claim 1, wherein:

the virtualization unit comprises a driver that operates the I/O adapter, the driver having a policy of a processing to be performed at a time of occurrence of an error set therein in advance; and the fifth step comprises:
   a fifteenth step of querying, by the virtualization unit, the policy of handling the error to the driver at the time of the occurrence of the error; and
   a sixteenth step of transmitting a state of the virtual function to the OS running on the virtual machine when the policy set in the driver is a reset attempt.

4. The method of controlling a virtual machine according to claim 1, wherein:
the virtualization unit comprises a driver that operates the I/O adapter, the driver having a policy of a processing to be performed at a time of occurrence of an error set therein in advance;
the method further comprises:
   a tenth step of re-initializing, by the virtualization unit, the I/O adapter after the OS stops using the virtual function;
   an eleventh step of re-creating, by the I/O adapter, the virtual function, and re-assigning, by the virtualization unit, the re-created virtual function to the virtual machine;
   a twelfth step of setting, by the virtualization unit, a mounting notification of the I/O adapter in the hot plug register;
   a thirteenth step of reading, by the OS, the hot plug register to detect mounting of the I/O adapter; and
   a fourteenth step of restarting, by the OS, using the virtual function; and
the fifth step comprises:
   a fifteenth step of querying, by the virtualization unit, the policy of handling the error to the driver at the time of the occurrence of the error; and
   a sixteenth step of transmitting a state of the virtual function to the OS running on the virtual machine when the policy set in the driver is a reset attempt.

5. The method of controlling a virtual machine according to claim 1, wherein:
the first step comprises detecting, by the virtualization unit, the state change of the virtual function of the I/O adapter;
the second step comprises identifying, by the virtualization unit, when a state of the virtual function becomes a predetermined state, the virtual machine to which the virtual function created by the physical function is assigned; and
the third step comprises notifying, by the virtualization unit, the OS running on the identified virtual machine of the state of the virtual function.

6. A computer, comprising:
a physical machine comprising a processor, a memory, and an I/O adapter having a physical function that creates a virtual I/O adapter as a virtual function;
a virtualization unit that provides computer resources of the physical machine to a virtual machine; and
an OS that is executed on the virtual machine, the virtualization unit creating at least one virtual machine to which the virtual function is assigned, wherein
the virtualization unit comprises:
   a fault processing unit that detects a state change of the I/O adapter, and
   assignment information that manages the virtual machine to which the virtual function created by the physical function is assigned, and the fault processing unit is configured to:
   reference the assignment information when a state of the I/O adapter becomes a predetermined state;
   identify the virtual machine to which the virtual function created by the physical function is assigned; and
   notify the OS running on the identified virtual machine of the state of the I/O adapter,
wherein
the I/O adapter comprises an error information register that stores error information; and
the fault processing unit is configured to:
   reference the error information register when a signal indicating an error that has occurred in the I/O adapter is received,
   detect the state change of the I/O adapter from the error information;
   control the identified OS to stop using the virtual function,
the virtual machine comprises a hot plug register that stores a mounting/removing request and a mounting/removing notification of the I/O adapter, and
the fault processing unit is configured to:
   perform the identifying for all the virtual functions,
   set a removal request of the virtual function in the hot plug register, and
   wait until every OS running on the identified virtual machine responds to the removal request of the virtual function set in the hot plug register.

7. The computer according to claim 6, wherein:
the fault processing unit is configured to:
   re-initialize the I/O adapter after the OS stops using the virtual function; and
   set a mounting notification of the I/O adapter in the hot plug register;
the I/O adapter re-creates the virtual function after the re-initializing;
the virtualization unit re-assigns the re-created virtual function to the virtual machine; and
the OS restarts using the virtual function after the hot plug register is read to detect mounting of the I/O adapter.

8. The computer according to claim 6, wherein:
the virtualization unit comprises a driver that operates the I/O adapter, the driver having a policy of a processing to be performed at a time of occurrence of an error set therein in advance; and
the fault processing unit is configured to:
   query the policy of handling the error to the driver at the time of the occurrence of the error; and
   transmit a state of the virtual function to the OS running on the virtual machine when the policy set in the driver is a reset attempt.

9. The computer according to claim 6, wherein:
the virtualization unit comprises a driver that operates the I/O adapter, the driver having a policy of a processing to be performed at a time of occurrence of an error set therein in advance;
the fault processing unit re-initializes the I/O adapter after the OS stops using the virtual function;
the I/O adapter re-creates the virtual function;
the virtualization unit re-assigns the re-created virtual function to the virtual machine;
the fault processing unit sets a mounting notification of the I/O adapter in the hot plug register;
the OS is configured to:
   read the hot plug register to detect mounting of the I/O adapter; and
   restart using the virtual function; and the fault processing unit is configured to:
  query the policy of handling the error to the driver at the time of the occurrence of the error; and
  transmit a state of the virtual function to the OS running on the virtual machine when the policy set in the driver is a reset attempt.

10. The computer according to claim 6, wherein the fault processing unit is configured to:
  reference the assignment information when a state of the virtual function becomes a predetermined state;
  identify the virtual machine to which the virtual function created by the physical function is assigned; and
  notify the OS running on the identified virtual machine of the state of the virtual function.

* * * * *